United States Patent [19]

Alspach et al.

[11] Patent Number: 5,529,185
[45] Date of Patent: Jun. 25, 1996

[54] TWIN SHEET PLASTIC PALLET WITH LATCH MEANS

[75] Inventors: James C. Alspach, Farmington Hills; Steven R. Spooner, Ann Arbor; Kurtis A. Nofz, Belleville, all of Mich.

[73] Assignee: Johnstown Industries, Inc., Plymouth, Mich.

[21] Appl. No.: 319,996

[22] Filed: Oct. 7, 1994

[51] Int. Cl.⁶ ................................................ B65D 19/44
[52] U.S. Cl. ...................... 206/386; 108/55.3; 108/55.5; 206/335
[58] Field of Search .................... 206/335, 326, 206/600, 386; 108/55.3, 55.1, 55.5

[56] References Cited

U.S. PATENT DOCUMENTS

| | | | |
|---|---|---|---|
| 4,606,278 | 8/1986 | Shuert | 108/901 X |
| 4,742,781 | 5/1988 | Shuert | 206/600 X |
| 4,796,540 | 1/1989 | Pelfrey | 108/55.3 |
| 4,936,451 | 6/1990 | Shuert | 206/386 |
| 5,011,011 | 4/1991 | Kidd | 206/386 X |
| 5,088,418 | 2/1992 | Reckermann et al. | 108/55.3 X |
| 5,101,964 | 4/1992 | Westphal | 108/55.5 X |
| 5,193,700 | 3/1993 | Lyman et al. | 706/386 X |

Primary Examiner—Bryon P. Gehman
Attorney, Agent, or Firm—Barnes, Kisselle, Raisch, Choate, Whittemore & Hulbert

[57] ABSTRACT

A low-profile, flat twin sheet thermoformed pallet adapted to carry and store relatively, heavy, bulky manufactured components having a high load profile relative to the low flat pallet profile. The disclosed pallet exemplary embodiment is particularly constructed for shipping and storing automotive vehicle passenger seats. The disclosed embodiment is a vehicle standardized pallet having cooperative seat load nesting compartments and a permanent on-board latching mechanism capable of removable receiving and securely attaching, with the same latch operating procedure, any one of the six different types of vehicle seat constructions, in pallet load groups of one or two, with the seats resting on their feet, and occupying predetermined positions in a given orientation thereon corresponding to their vehicle orientation in use. The pallet thus provide, in a grouping of pallets, a vehicle seat load bar-bode identifiable in advance for shipment from the seat manufacturer to the vehicle final assembly plant under just-in-time inventory supply system conditions so as to automatically deliver to the appropriate assembly line station the correct selection of seating for a given vehicle option in a rapid, reliable, automated and economical manner.

21 Claims, 15 Drawing Sheets

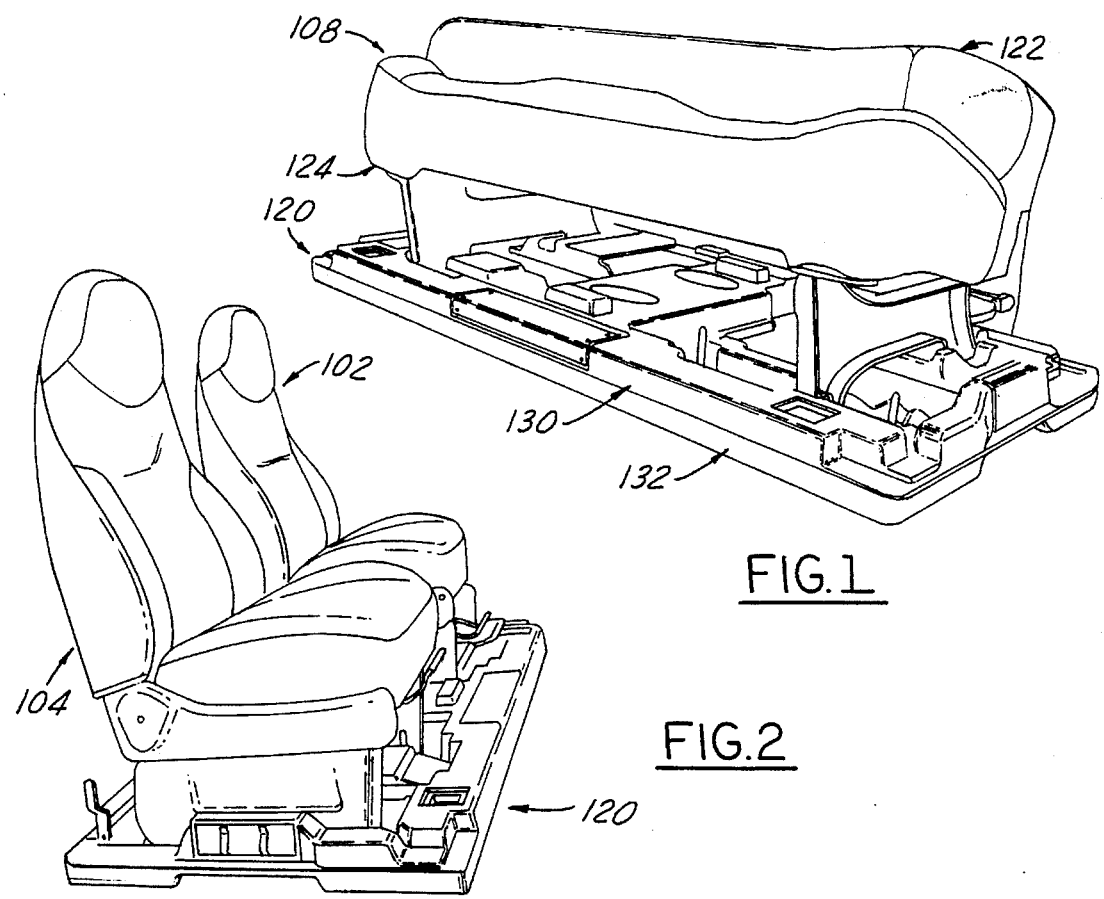
FIG. 1
FIG. 2
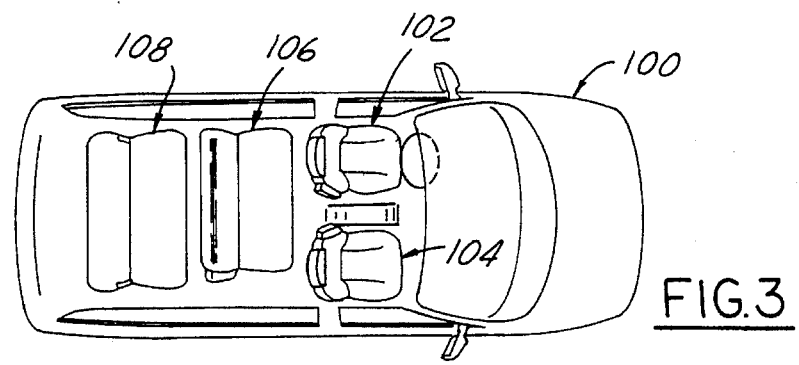
FIG. 3
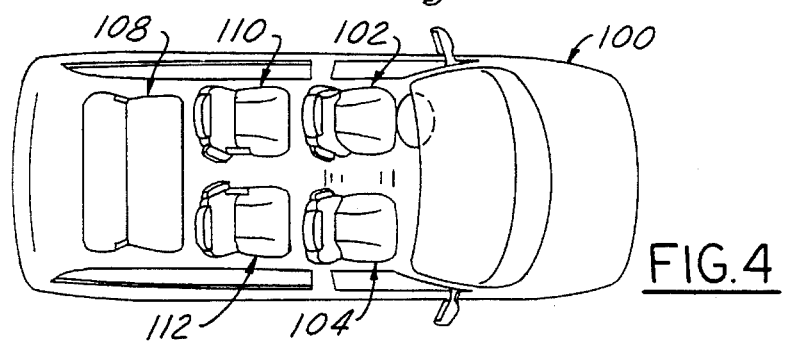
FIG. 4

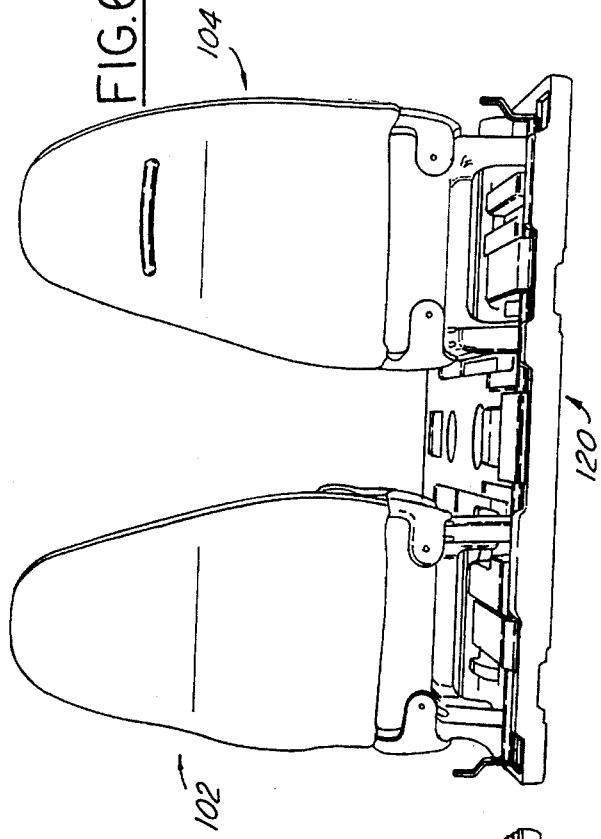
FIG.5
FIG.6
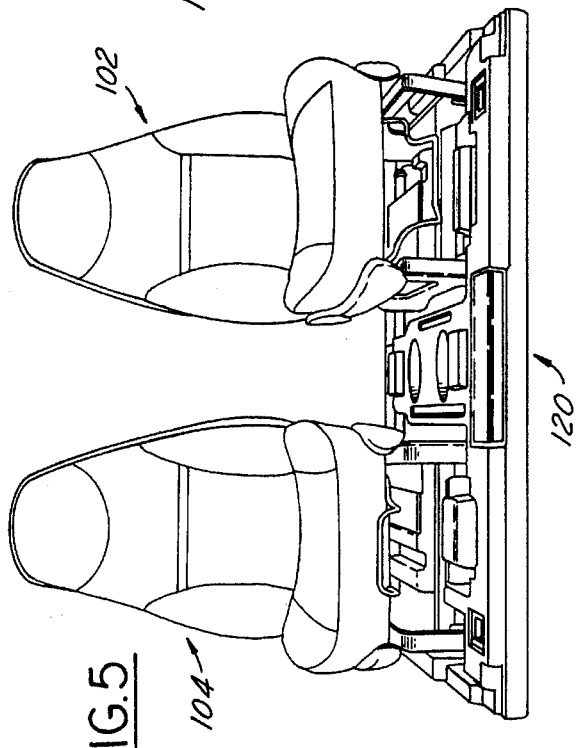
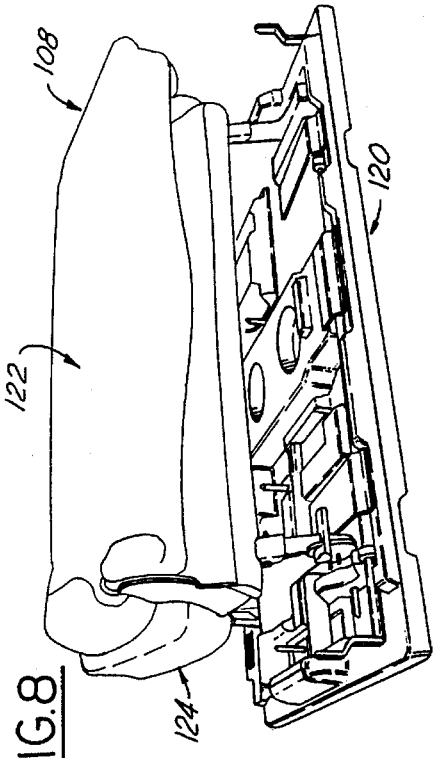
FIG.7
FIG.8

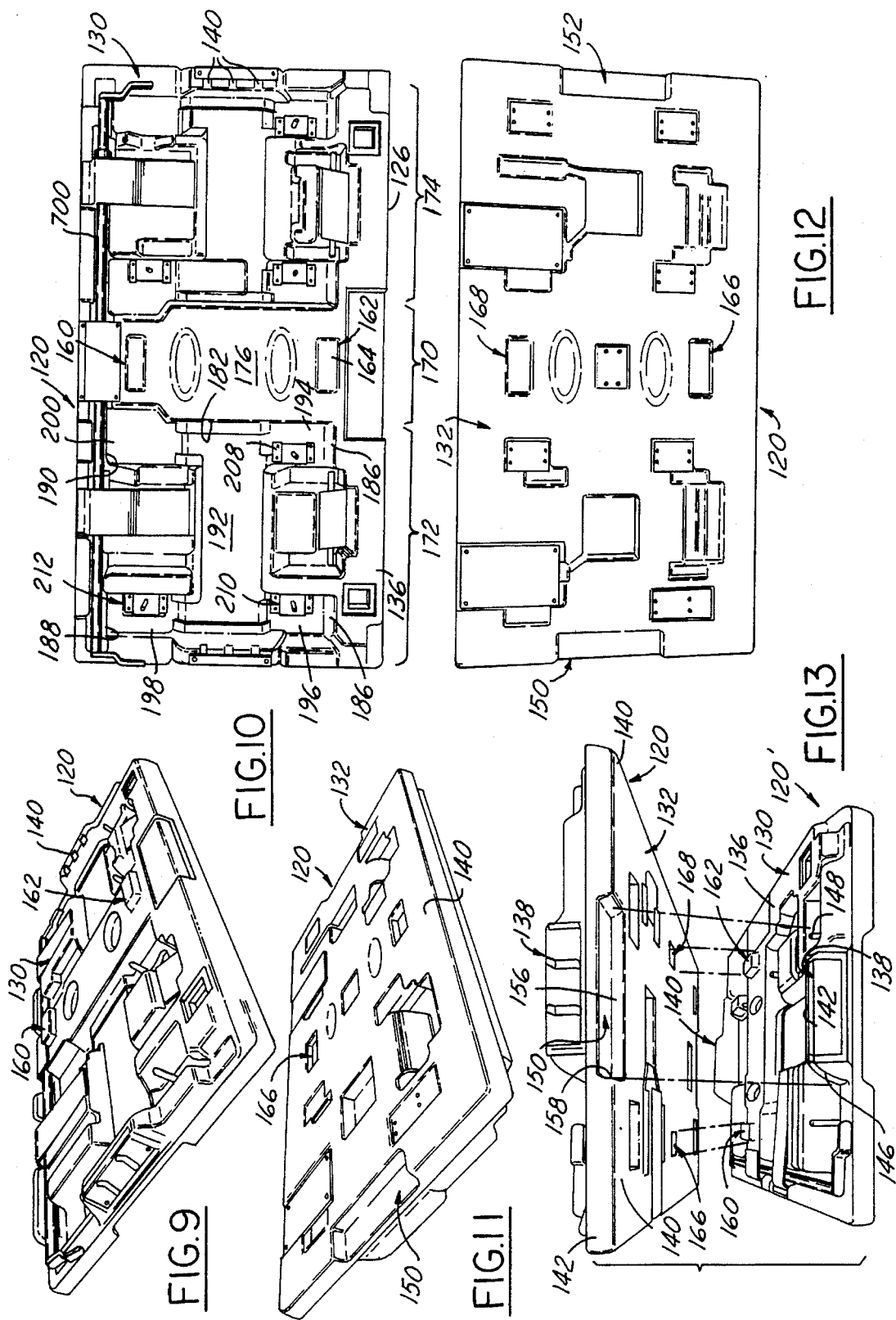

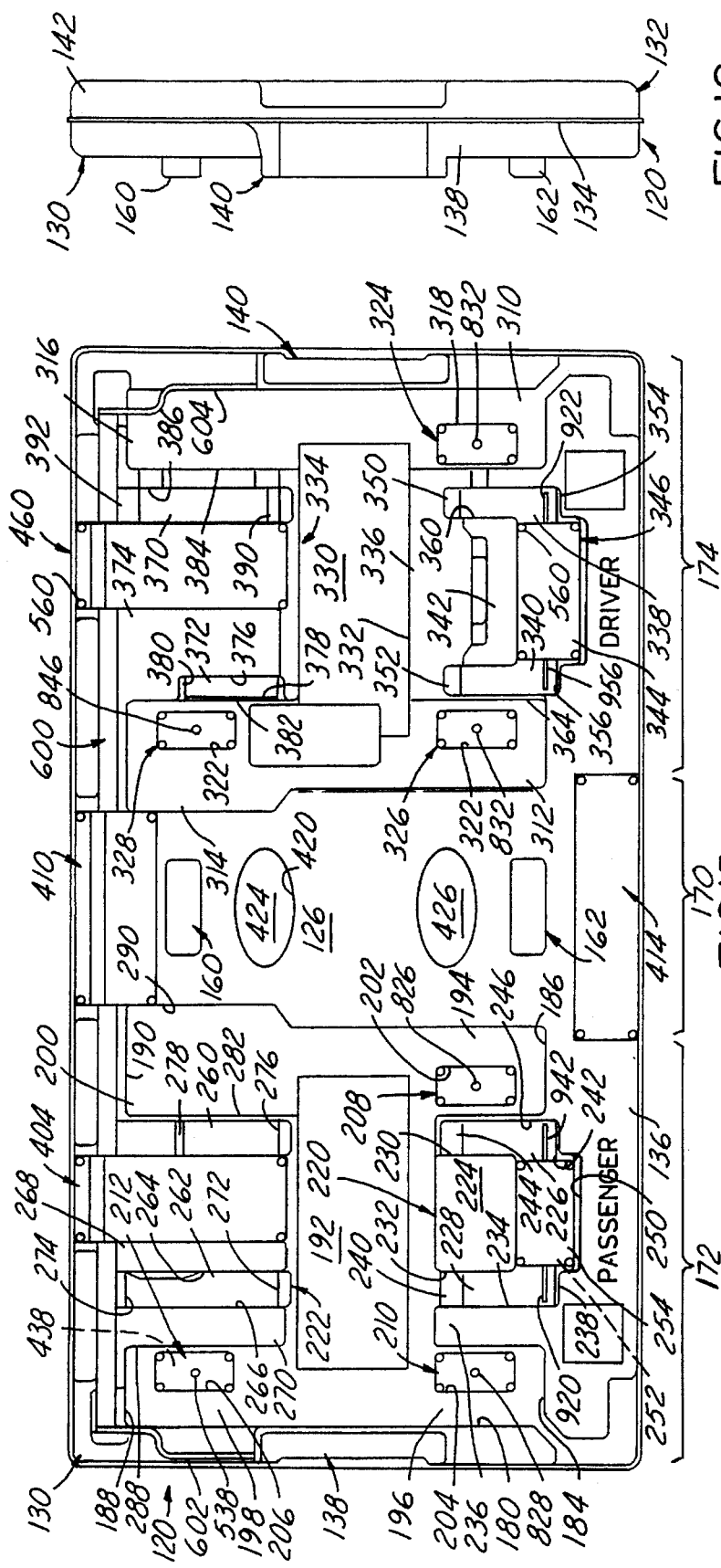
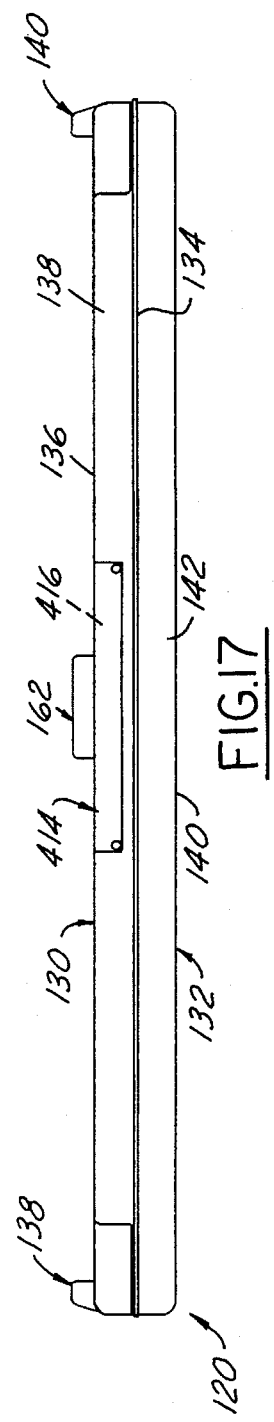

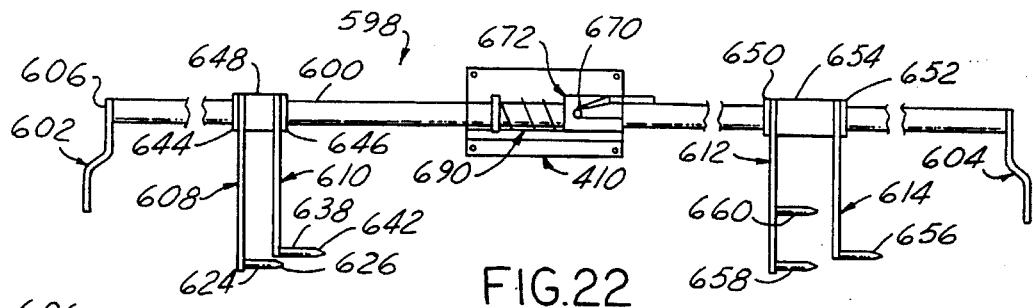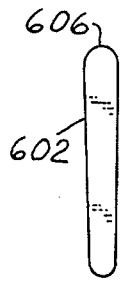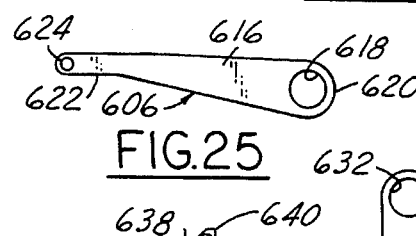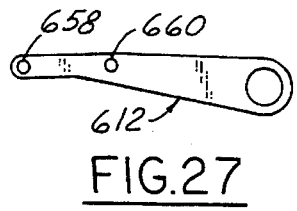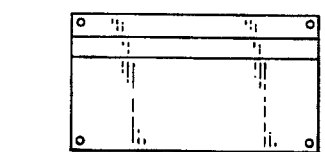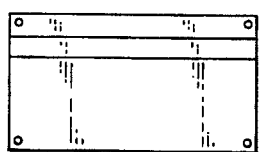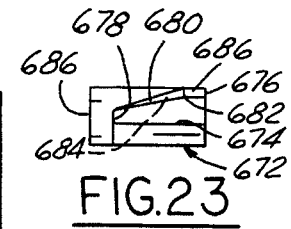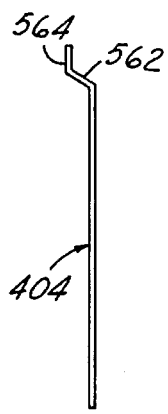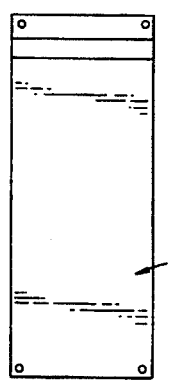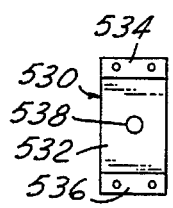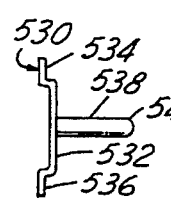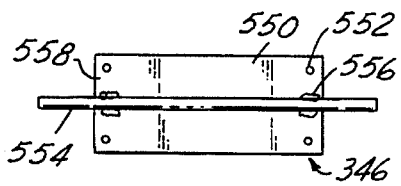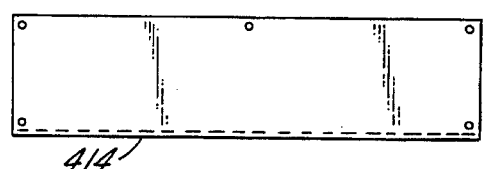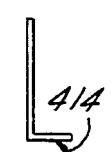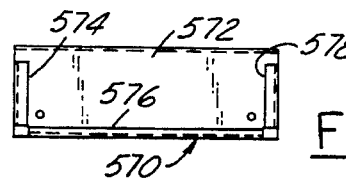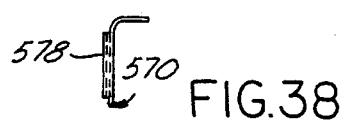

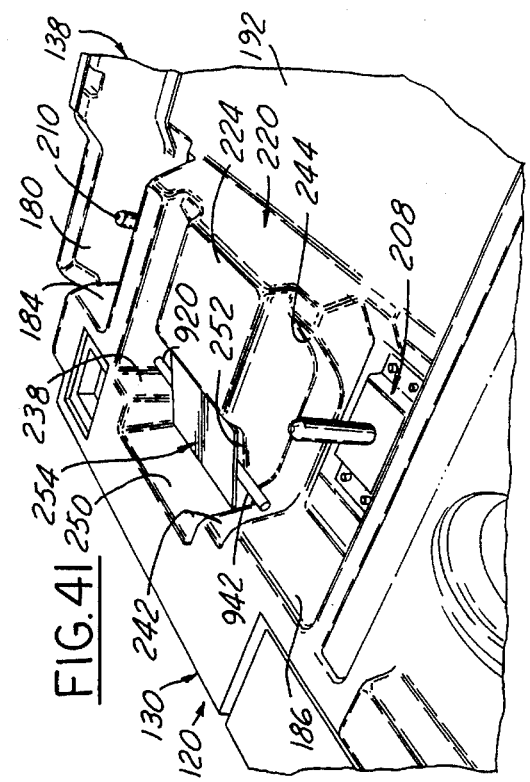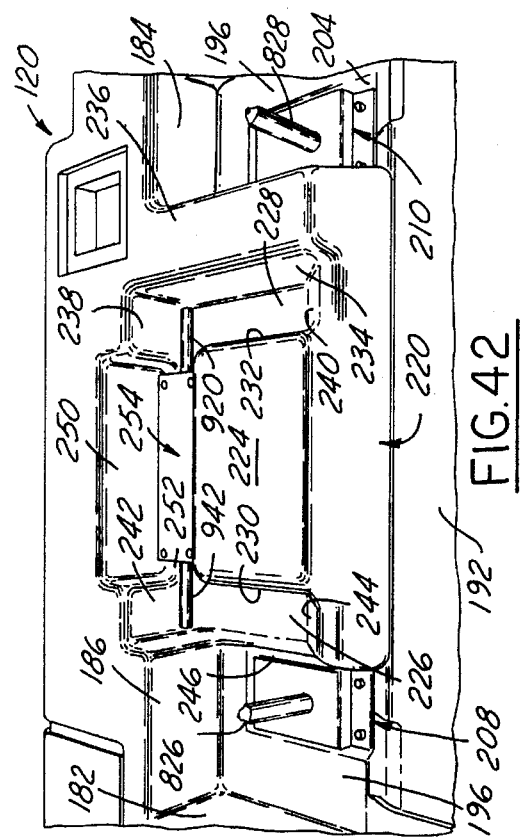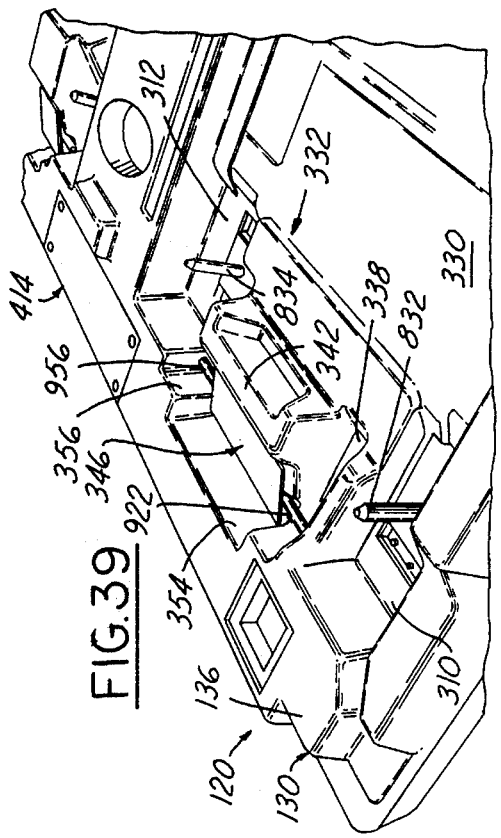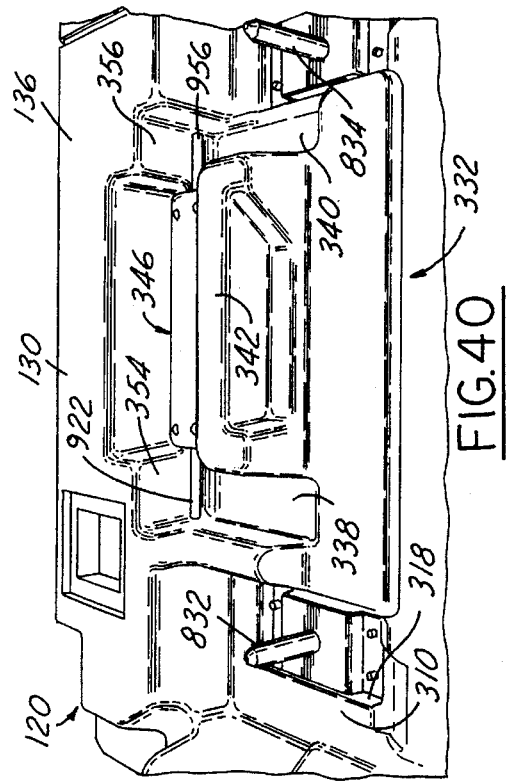

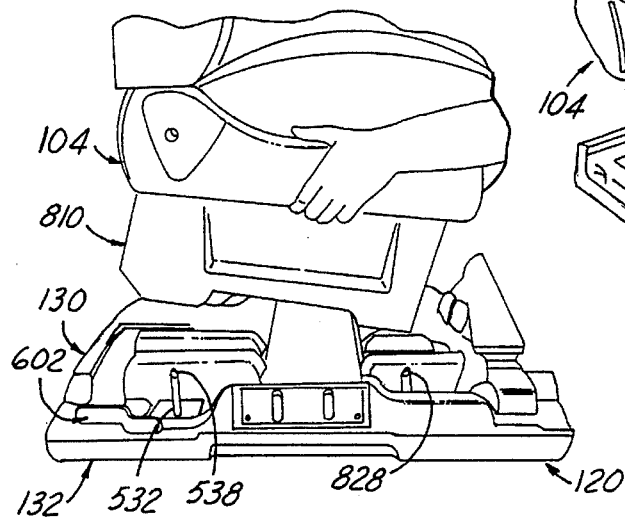
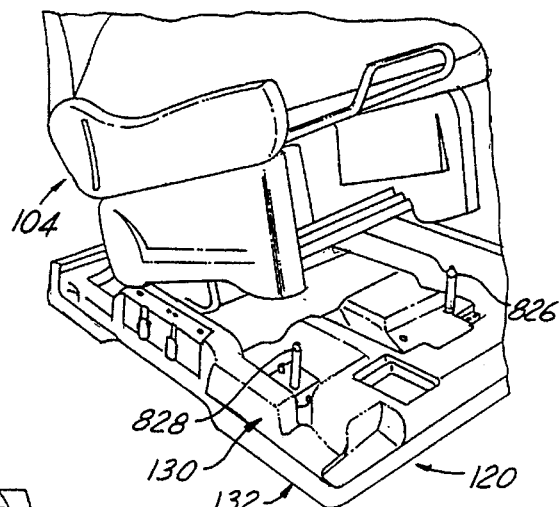
FIG.51
FIG.50
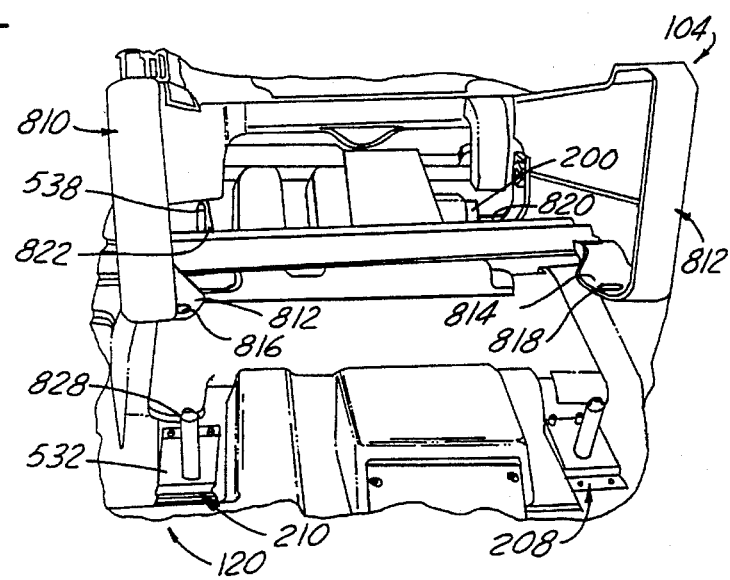
FIG.52
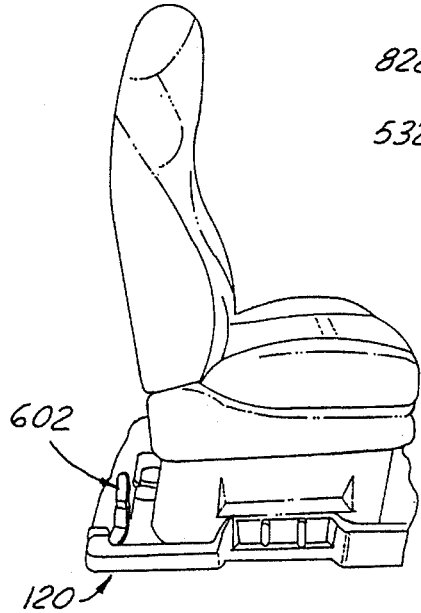
FIG.53

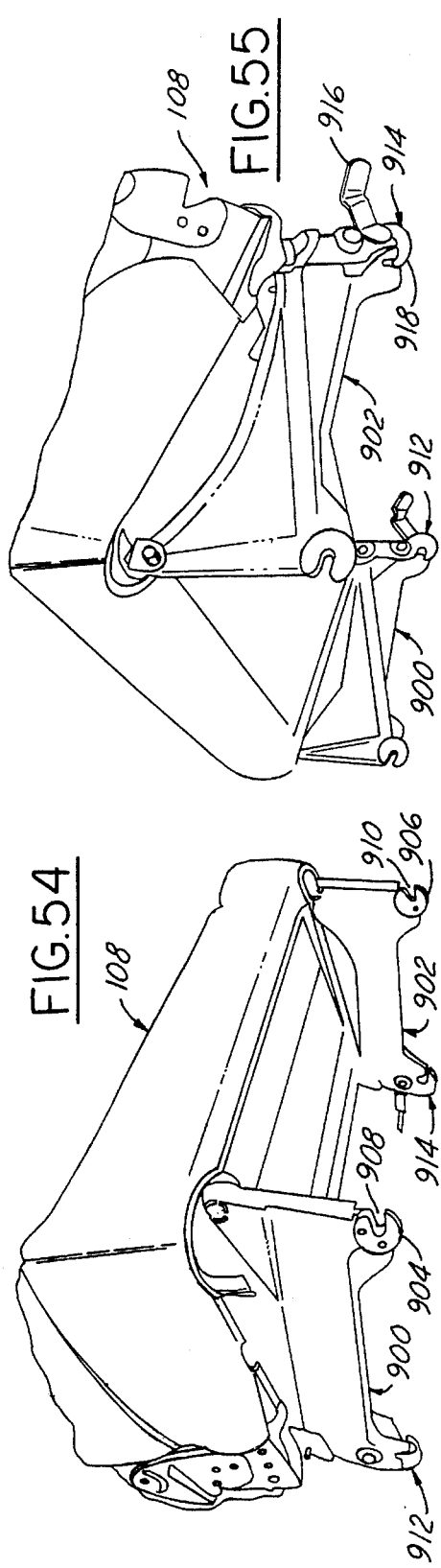
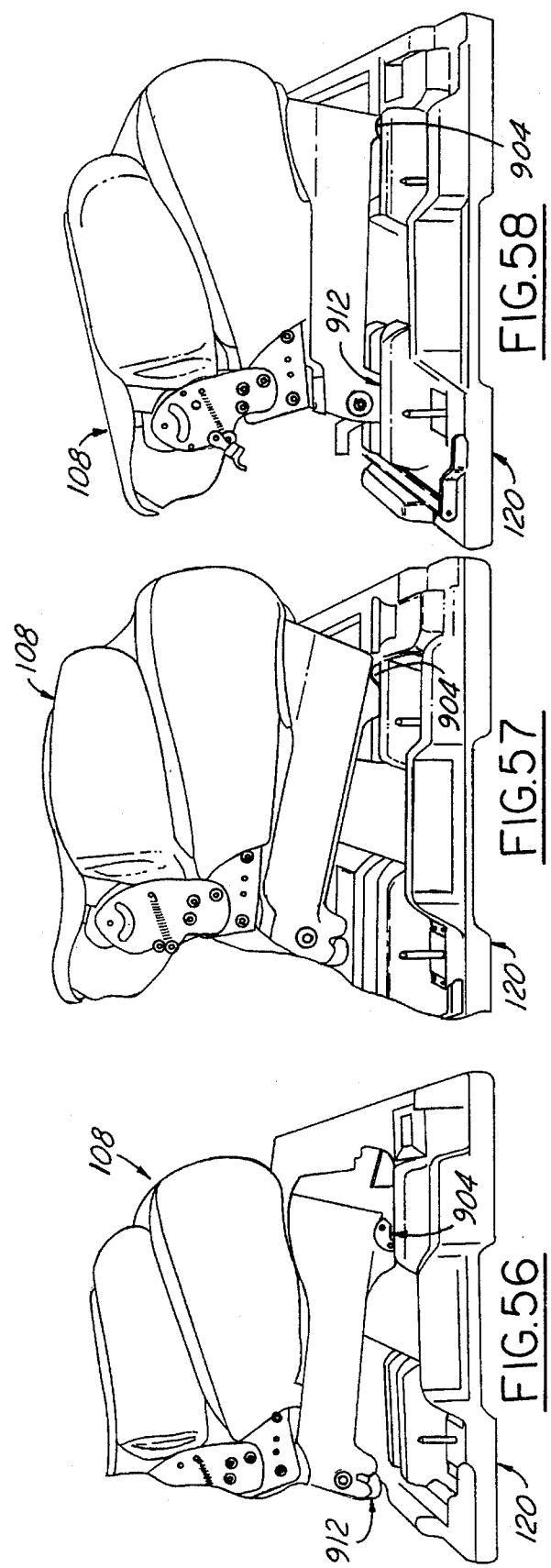

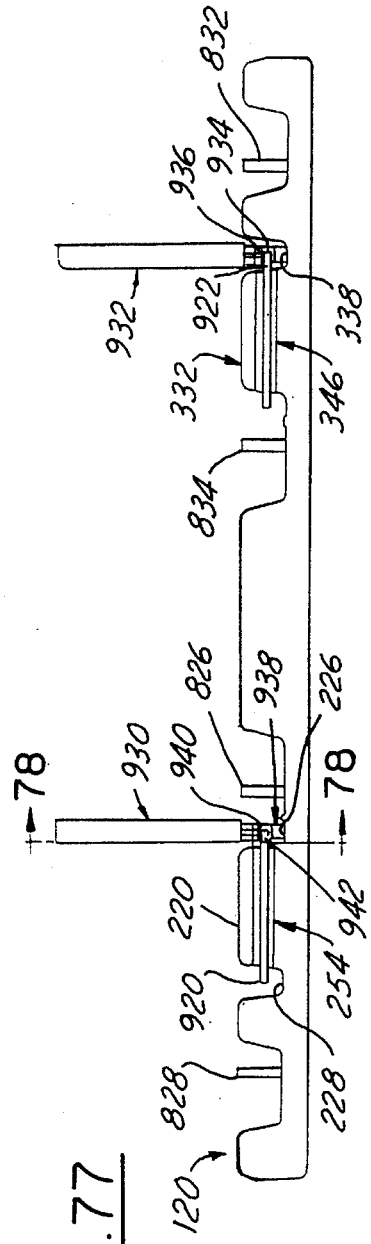
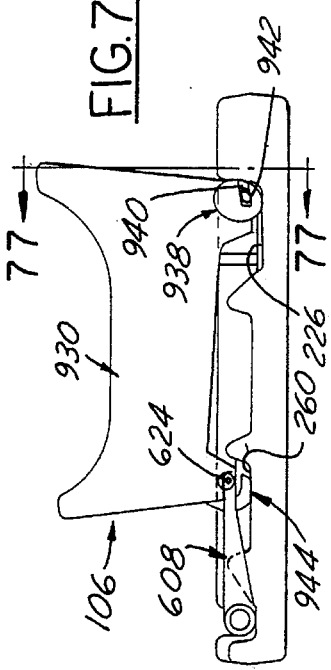
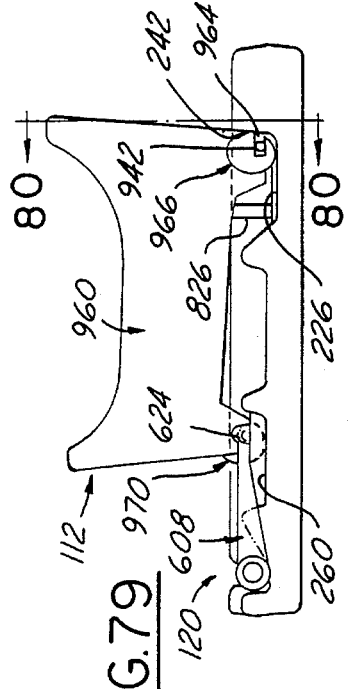
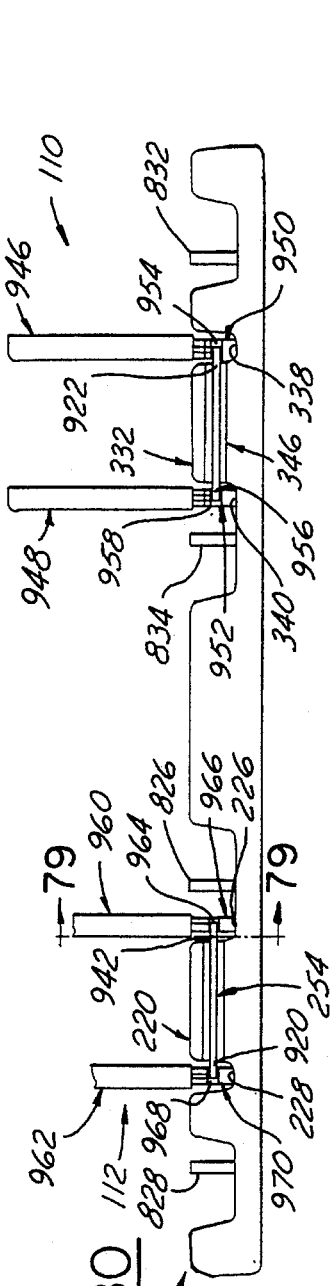

TWIN SHEET PLASTIC PALLET WITH LATCH MEANS

FIELD OF THE INVENTION

This invention relates to shipping and storage pallets, and more particularly to a twin sheet thermoformed plastic pallet for use in transporting and storing manufactured goods from their point of origin at a subassembly manufacturing facility to their ultimate delivery to the assembly line of a final assembly facility.

BACKGROUND OF THE INVENTION

Pallets for transporting and storing relatively heavy manufactured articles have traditionally been constructed of wood and metal and, in more recent years of plastic. Soft wood pallets are widely available and easily constructed, but because of the variability of timber characteristics the load carrying capacities and lifetime of wooden pallets are unpredictable. Furthermore, when, due to ordinary wear and usage a wooden pallet must be junked, there is very little salvage value in the scrap wood. Wood pallets are also subject to breakage, thus are not reusable over an extended period of time. Wood pallets also take up a considerable amount of valuable floor space in the factory or warehouse when they are not in use.

Steel pallets, while having increased strength characteristics, are expensive to manufacture. Both wood and steel pallets can be of considerable weight and neither are easily recycled, resulting in additional costs for disposal at the end of their useful life.

Plastic pallets have been gaining increased acceptance due to factors such as consistent physical characteristics and load-carrying capacity, high strength-to-weight ratio, resistance to corrosion, and durability. Plastic pallets also can be manufactured relatively economically to relatively close overall outside dimensional tolerances. Such pallets can also be made with relatively wide, flat planar supporting surfaces, rendering them particularly well adapted to be supported and easily moved on conveyors and the like having live or gravity rolls, "slide-by" side guide walls, automatic track switching arrangements and other automated equipment.

As a result of these and other factors, attempts have been made to develop lightweight plastic pallets that are relatively economical to manufacture but which are of sufficient strength so as to be capable of supporting and handling the large, heavy loads customarily associated with wood and metal pallets. In one generally successful form of plastic pallet design, upper and lower plastic sheets are vacuum formed in separate molding operations in juxtaposed but separated molds. The two sheets are then selectively fused or "knitted" together by closing the molds together to thereby form a reinforced double wall or "twin sheet" structure. Such twin sheet thermoformed plastic pallets may be made on vacuum forming machines such as those shown in the U.S. Pat. Nos. to Brown 3,583,036; 3,787,158; and 3,925,140.

These twin sheet plastic pallets, although substantially more durable and dimensionally accurate than the wooden pallets they replace, tend to have a substantially higher initial cost than the corresponding wooden pallets due in large part to the relatively high cost of the raw plastic material required to form the pallet. Typically the top and bottom twin sheets of the pallet are made by vacuum forming sheets of organic polymeric material, such as high density polyethylene. It is therefore critical that the twin sheet type of pallet embody a structural design that maximizes the structural strength of the pallet for a given amount of plastic material employed to form the pallet. Accordingly, twin sheet plastic pallets need to be designed to take maximum advantage of the materials used by maximizing the load capacity for the given amount of material used in forming the pallet. Thus the top and bottom pallet deck sheets are vacuum mold formed respectively having dependent and upstanding peripheral side walls joined to one another along a peripheral seam line by fusion of the thermoplastic material while at an elevated temperature and under the pressure of the forming press. This overall configuration thus forms a generally flat, pancake-like hollow clam shell structure having a high strength-to-weight ratio. Additionally, prior art efforts to increase the structural strength of the pallet have included providing a plurality of recessed channels, ribs, pockets, etc., which extend inwardly transversely from the outer major plane of the pallet top and bottom sheets respectively. The two sheets are also selectively fused or knitted together in the press where these interior surfaces of these respective indentations meet and abut in the interior closed space of the pallet. The structures formed by the downwardly depending and upwardly projecting bosses, ribs, etc., fused together provides a rigid reinforced structure which resist deformation of the deck (in addition to reinforcement provided by the fused-together peripheral side walls of the top and bottom sheets).

Another important parameter in the construction of such twin sheet plastic pallets is stackability when empty to minimize storage space and return-transport storage volume. Various complementary nesting configurations have been provided in the opposed planar surfaces of the stacked pallets to facilitate such stacking in a secure stable array.

Whereas such twin sheet pallets of the prior art have been highly successful and have been widely commercialized, hitherto so far as is known, such pallets have not been successfully constructed to have the capability of reliably transporting relatively bulky, heavy and expensive loads such as manufactured subassemblies, particularly those having a high load profile relative to pallet profile, such as automotive vehicle passenger seats. Accordingly, heretofore such vehicle seats have been packaged individually in cartons or boxes at the seat manufacturing facility, usually located geographically relatively remote from the automotive final assembly plants, shipped or transported as so containerized, and then handled as packaged goods at the assembly plant for sorting, unpacking and delivery to the assembly stations along the assembly line. These operations require care in preventing damage to the natural or synthetic textile, leather, vinyl sheet and/or seat coverings as well as to the frame and vehicle floor mounting structure of the seats. These as well as other factors have hitherto made the vehicle seating the next most expensive component of the vehicle, after the engine, to manufacture and install in the vehicle. While other vehicle components have been successfully palletized, as plural groups of identical components, hitherto palletization of automotive passenger seats, so far as known, has not been deemed feasible or successfully accomplished utilizing plastic pallet technology available to date to provide twin sheet type pallets adapted for automated roll-conveyor selection, sorting and delivery to assembly line stations to thereby significantly reduce vehicle assembly costs.

Another serious problem posed by shipping, storage and assembly of automotive passenger seats for many types of automotive vehicles resides in the potentially large number of different seat frame constructions encountered to satisfy the variety of seating options currently provided to the customer for a given vehicle. For example, in one popular mini-van vehicle of American manufacture, namely the "Windstar" mini-van model currently manufactured by Ford Motor Company of Dearborn, Mich., eight different interior seating arrangements and combinations are provided utilizing six different seat frames namely: (1) bolt-on-permanent mount type front driver-side single bucket seats, (2) bolt-on-permanent mount type front passenger side single bucket seats, (3) removable mount two-passenger second row bench seats; (4) removable mount three-passenger third row bench seats; (5) driver-side removable mount single-passenger second row bucket seats; and (6) passenger-side removable mount single-passenger second row bucket seats. The selection of the given assortment of these seat types to provide any one of the eight seating arrangements to satisfy customer orders or provide dealer inventory variety for this mini-van has thus posed an expensive supply and assembly problem for the vehicle manufacturer using hitherto available automotive seat carton or container-type packaging, shipping and storage procedures and equipment.

OBJECTS OF THE INVENTION

Accordingly, it is an object of the present invention to provide an improved low-profile, flat twin sheet thermoformed pallet, and an improved method of constructing and using the same in an improved shipment packaging system of the invention, in which the pallet is adapted to carry and store relatively, heavy, bulky manufactured components having a high load profile relative to the low flat pallet profile in an economical, secure and reliable manner.

It is a further object of this invention to provide an improved twin sheet plastic pallet of the aforementioned character having increased durability to accomplish the aforementioned object with only a limited increase in overall weight and associated non-plastic structures.

Another object is to provide an improved pallet of the aforementioned character which is adapted to solve the aforementioned problems of shipping and storing automotive vehicle passenger seats by enabling secure and removable attachment of such seats thereto, which is easy to load and unload, which is adapted to automated roll conveyor handling systems, which can withstand rough handling with a seat load attached without loss of load or damage to the load, which can accommodate, whether loaded or empty, severly inclined conveyor grades, either ascending or descending, and which has a relatively wide, flat bottom surface capable of transiting conveyor junctions and gaps.

Another object is to provide an automotive seat shipping system utilizing a universal but vehicle standardized pallet of the aforementioned character which is capable of removable receiving and securely attaching any one of the six different types of vehicle seat constructions, in pallet load groups of one or two, with the seats resting on their feet, and occupying predetermined positions in a given orientation thereon corresponding to their vehicle orientation in use, in order to provide in a grouping of pallets a vehicle seat load identifiable in advance for shipment from the seat manufacturer to the vehicle final assembly plant under just-in-time inventory supply system conditions so as to automatically deliver to the appropriate assembly line station the correct selection of seating for a given vehicle option in a rapid, reliable, automated and economical manner.

A still further object is to provide an improved pallet of the aforementioned character which is well adapted to carry bar coded identification for automatic selection and sorting among, and selective delivery of, a plurality of such pallets of identical construction but carrying different cargo load components and subassemblies to facilitate automatic delivery directly to the appropriate assembly line stations for removal of cargo from the pallet and installation of the same in the product being assembled along the conveyor line.

Still another object of the present invention is to provide an improved twin sheet pallet that incorporates all of the aforementioned features and yet is also capable of being stack nested so that the pallets can be securely stacked when empty for storage and shipment in as small an area as possible.

Yet another object of the present invention is to provide an improved pallet of the aforementioned character embodying a relatively simple yet strong, reliable and easily operated load latching system and mechanism, and cooperative load nesting pallet structural configuration integrated into the pallet so as to securely but removably retain large, relatively heavy and bulky high load profile articles on the pallet against movement in any direction relative to the pallet.

Still another object of the present invention is to provide an improved pallet of the aforementioned character constructed so as to achieve all of the aforementioned objects, while also being readily manufacturable efficiently and economically from conventional thermoplastic materials utilizing existing twin sheet thermoplastic vacuum forming manufacturing equipment and technology and with a minimum of manufacturing steps and expense.

BRIEF DESCRIPTION OF THE DRAWING FIGURES

The foregoing as well as other objects, features and advantages of the present invention will become apparent from the following detailed description, appended claims, and accompanying drawings wherein:

FIG. 1 is a photoprint perspective view of a Ford Motor Company 1995 model year "Windstar" mini-van third row bench seat removably mounted and secured for shipment and storage upon an exemplary but preferred embodiment of a twin sheet thermoplastic pallet constructed in accordance with the present invention;

FIG. 2 is a perspective photoprint view illustrating "Windstar" van front row passenger and driver seats removably mounted and secured side-by-side for shipment and storage on the same pallet as shown in FIG. 1;

FIGS. 3 and 4 are photoprint top plan views illustrating two of the possible eight seating layouts of the aforementioned "Windstar" mini-van;

FIGS. 5 and 6 are photoprint front and rear views respectively of the driver and passenger seats as mounted on the pallet as shown in FIG. 2;

FIGS. 7 and 8 are photoprint front and rear views respectively of the third row bench seat as mounted on the pallet as shown in FIG. 1;

FIGS. 9 and 10 are photoprint perspective and plan views respectively illustrating the exterior configuration of the upper side of the top deck of the pallet shown in FIGS. 1–8 when empty of any cargo load thereon;

FIGS. 11 and 12 are photoprint perspective and plan views respectively each illustrating the exterior configuration of the lower side of the bottom deck of the pallet shown in FIGS. 1–10 when empty;

FIG. 13 is a photoprint perspective end view of two of the pallets of FIGS. 1–12 shown spaced apart and superimposed to illustrate their internesting relationship when stacked one upon the other;

FIG. 15 is a plan view, in layout line drawing form to scale of the top deck upper side of the pallet of FIGS. 1–14 and oriented in the plane of the drawing identical to the corresponding photoprint view thereof in FIG. 10;

FIG. 16 is an end elevational layout line drawing view of the right hand end of the pallet as viewed in FIG. 15;

FIG. 17 is a side elevational layout line drawing view of the front side of the pallet of FIG. 15;

Figure 18:
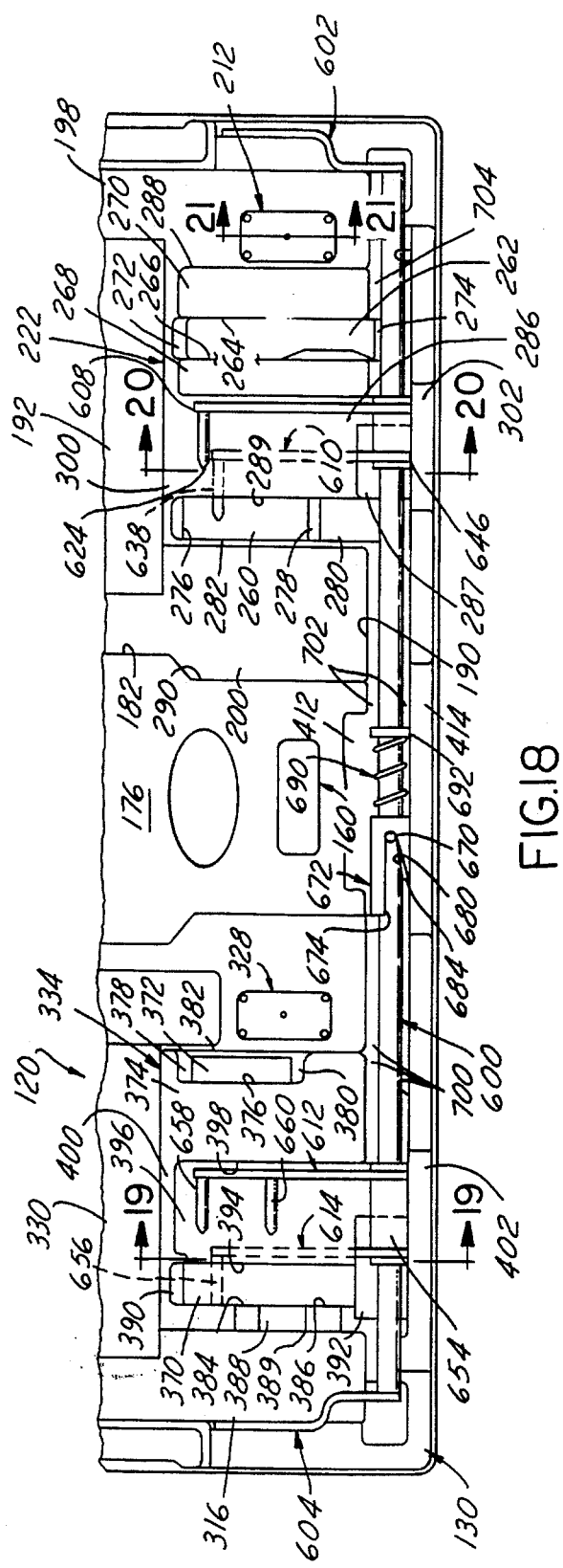
FIG. 18 is a fragmentary plan line drawing view of the upper side of the top deck of the pallet of FIGS. 1–17 illustrating the latching mechanism of the invention installed thereon but with the cover plates for the locking fingers and latch lock mechanism removed.
Figure 21:
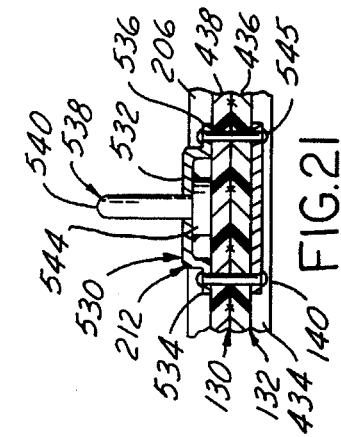
Figure 20:
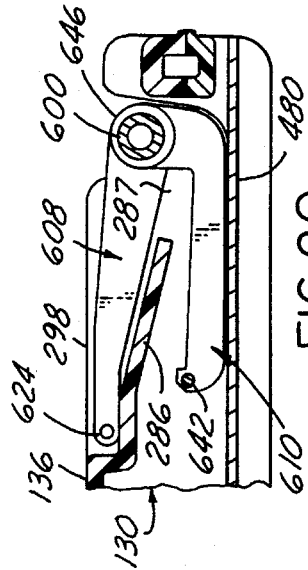
Figure 19:
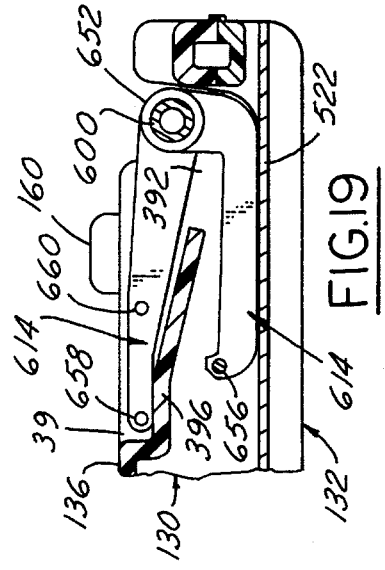
Figure 43:
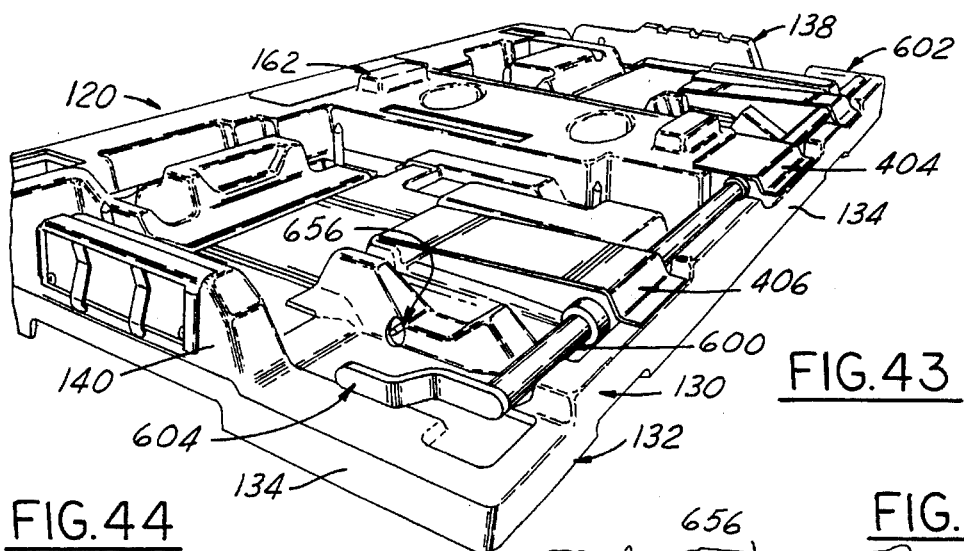
Figure 48:
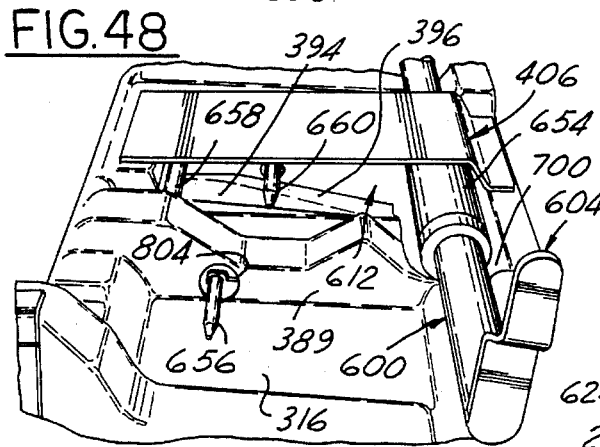
Figure 49:
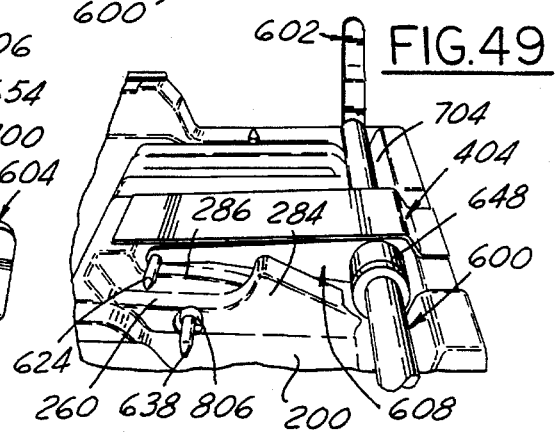
Figure 59:
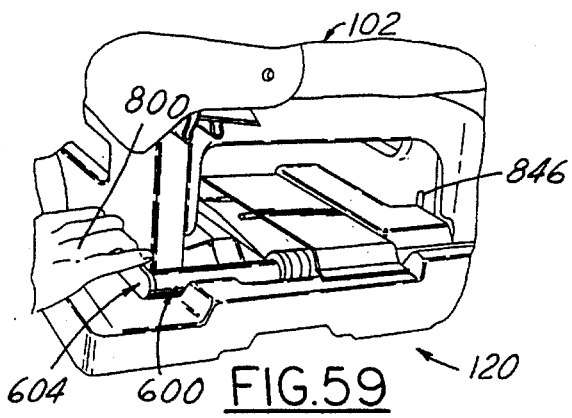
Figure 60:
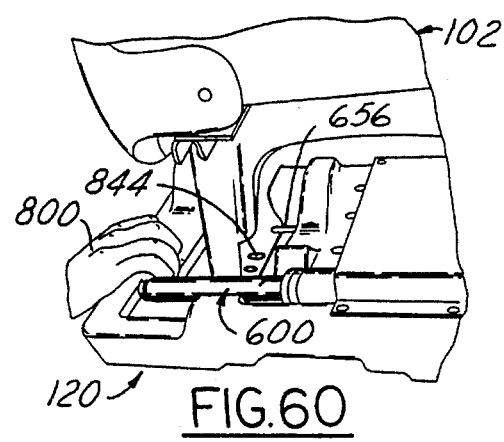
Figure 61:
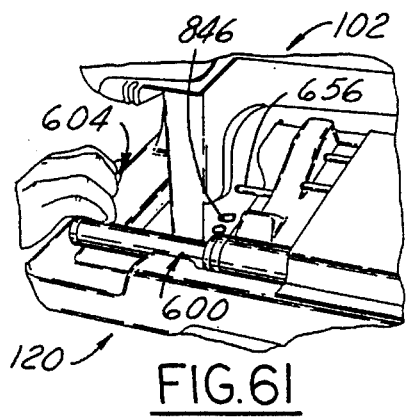
Figure 62:
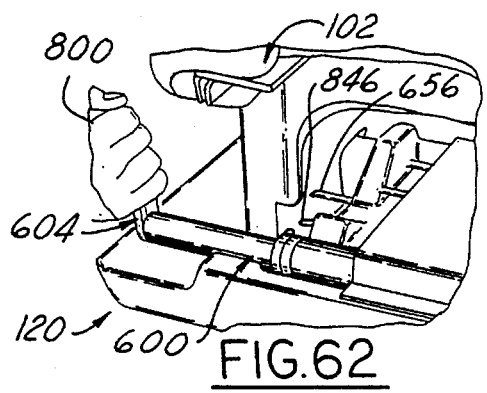
Figure 63:
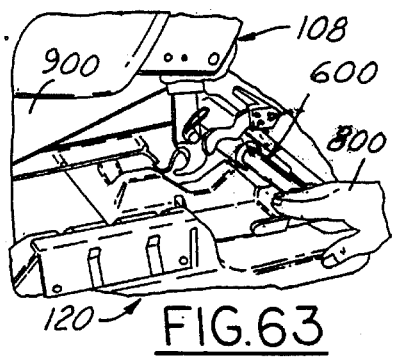
Figure 64:
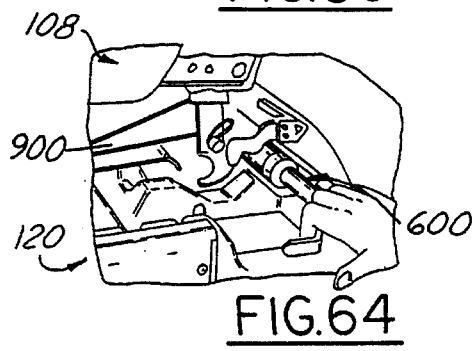
Figure 65:
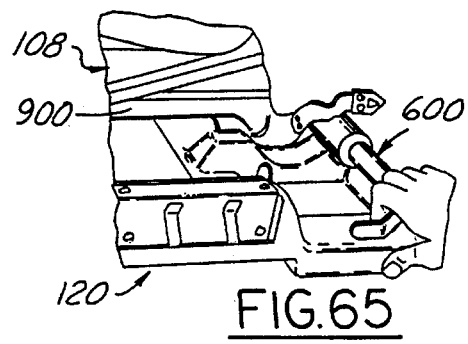
Figure 68:
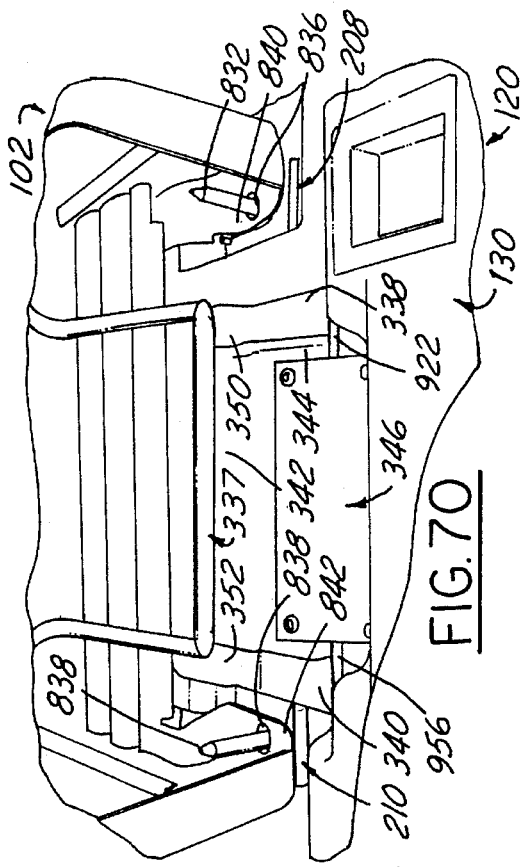
Figure 71:
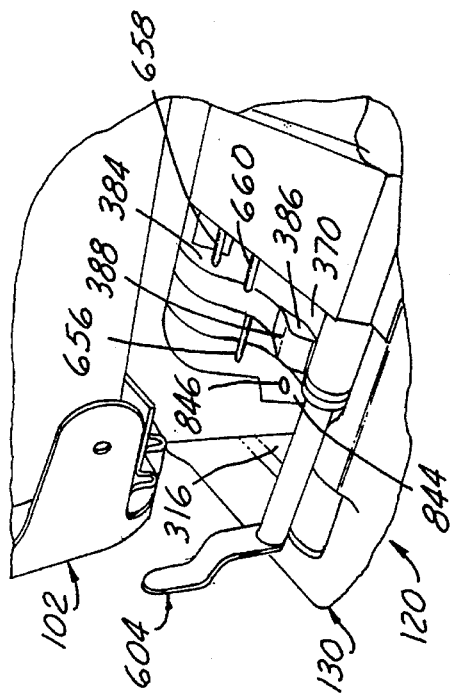
Figure 70:
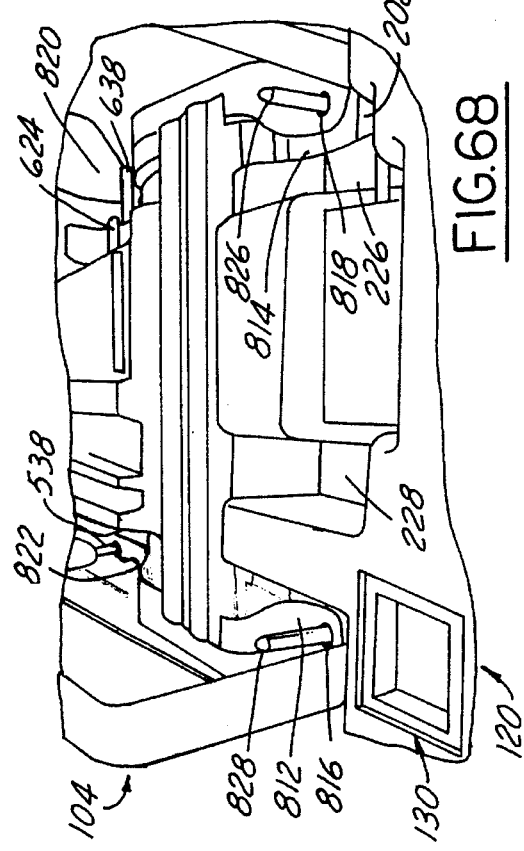
Figure 69:
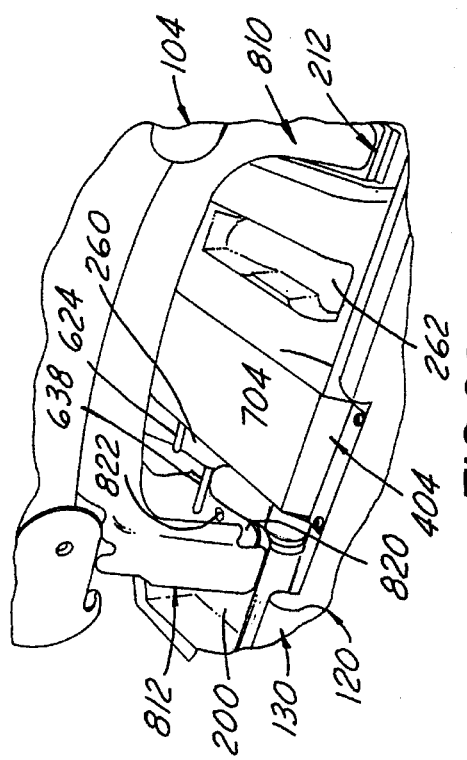
Figure 76:
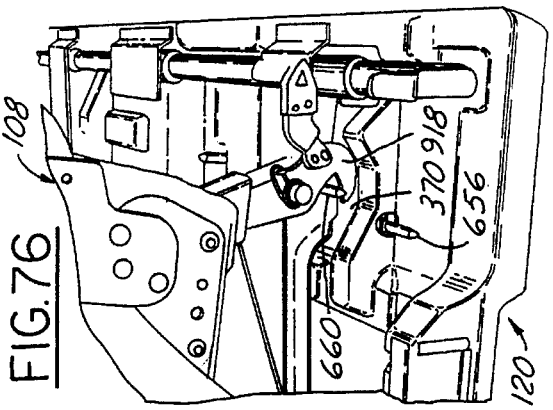
Figure 74:
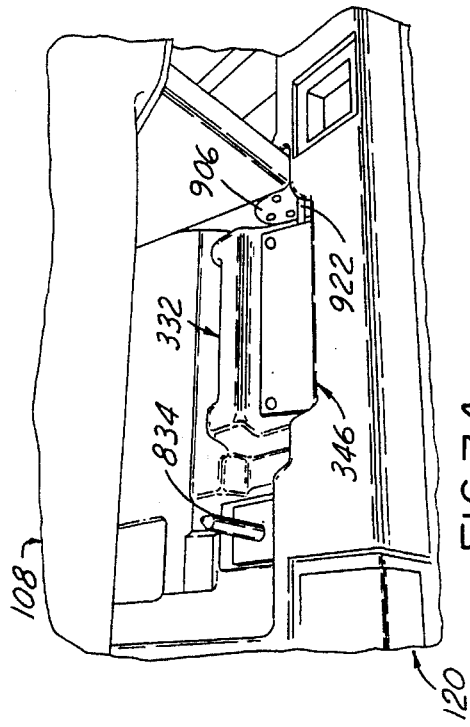
Figure 75:
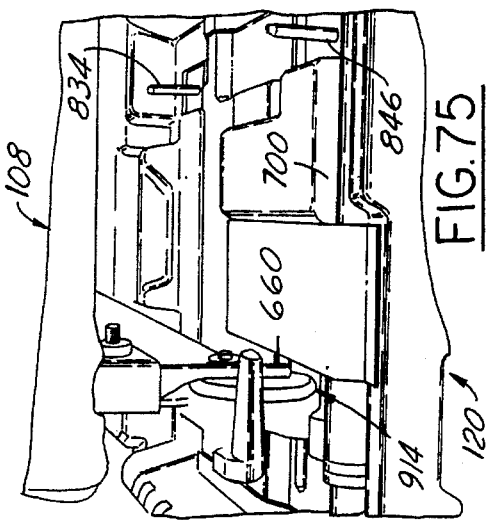
Figure 72:
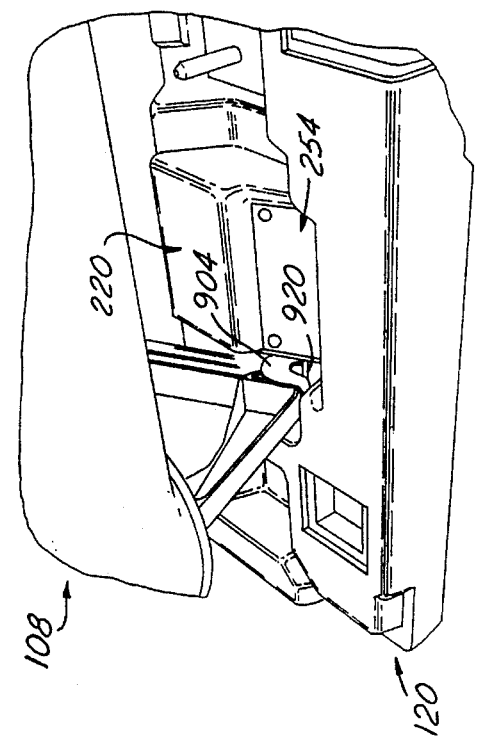
Figure 73:
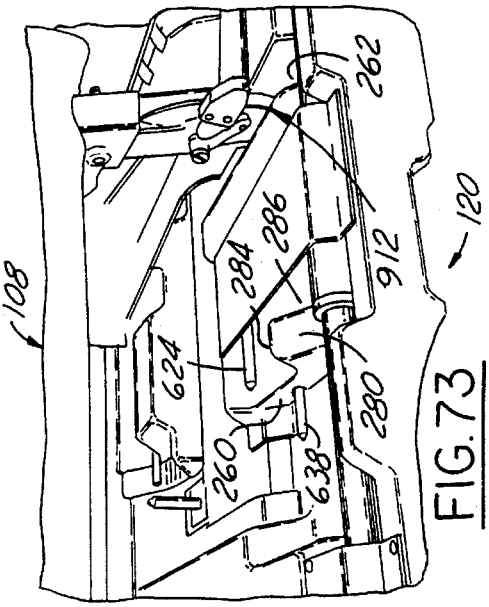

FIGS. 19, 20 and 21 are fragmentary vertical cross-sectional views taken respectively on the lines 19—19, 20—20 and 21—21 of FIG. 18;

FIG. 22 is a fragmentary bottom plan view of the seat latching mechanism of the pallet shown by itself as a substantially complete subassembly;

FIGS. 23 and 23A are side and end elevational detail line drawing views respectively of the locking sleeve of the latch mechanism of FIG. 21 shown by themselves;

FIG. 24 is an end line drawing view of one of the two latch operating handle arms of the latch mechanism;

FIGS. 25, 26 and 27 are side elevational line drawing views of the single-pin upper arm, single-pin lower arm and dual-pin upper arm, respectively, as utilized in the latch mechanism of FIG. 21;

FIGS. 28 and 29 are side elevational and plan views respectively of one of the two top deck cover plates for the latching arm compartments of the latch mechanism of FIG. 21;

FIGS. 30 and 31 are side elevational and top plan line drawing views respectively of the cover plate for the centrally located locking sleeve, spring and associated collar of the latch mechanism of FIG. 21;

FIGS. 32 and 33 are top plan and side elevational line drawing views respectively of one of the six mounting pins and associated bracket utilized in conjunction with the side-by-side mounting of the passenger and driver seats on the pallet;

FIG. 34 is a bottom plan line drawing view of the mounting rod and associated mounting bracket plate utilized in the driver-side compartment of the pallet for selective interengagement with the front claws of the various seats to be carried on the pallet;

FIGS. 35 and 36 are plan and side elevational line drawing views respectively of a cover plate utilized on the pallet top deck to enclose a counterweight cavity therein;

FIGS. 37 and 38 are side elevational and end elevational line drawing views respectively of one of two bar code label holders utilized on the ends of the pallet top deck;

FIGS. 39 and 40 are photoprint perspective views from different angles of the front area of the top deck driver side compartment of the pallet;

FIGS. 41 and 42 are photoprint perspective views from different angles of the front area of the top deck passenger-seat compartment of the pallet;

FIG. 43 is a photoprint perspective view of the upper side of the pallet, rotated 180° from the view of FIG. 9, again illustrating the pallet empty and the latching mechanism in fully released position ready for loading of the pallet;

FIGS. 44, 45, 46 and 47 are fragmentary photoprint perspective views of the rear left hand corner area of the empty pallet of FIG. 43 illustrating in sequence operating steps in manually operating latch mechanism the illustrated embodiment of the invention between pin-retracted/load-release and pin-extended/load-engaging and locked positions thereof;

FIGS. 48 and 49 are perspective photoprint views of the rear driver-side and passenger-side retractable load locking pins and associated locking arms of the latch mechanism shown in extended, load-engaging and locked position, but with the pallet empty;

FIGS. 50, 51, 52 and 53 are photoprint fragmentary perspective views illustrating in sequence the manual loading of the front passenger seat of FIG. 2 on the pallet;

FIGS. 54 and 55 are photoprint perspective views of the third row bench seat of FIG. 1 shown by itself and taken respectively from the passenger side and driver side of the seat and from an angle slightly therebeneath to better illustrate the bench seat undercarriage side framework structure;

FIGS. 56, 57 and 58 are photoprint perspective views illustrating the sequence of manual loading the bench seat of FIGS. 54 and 55 onto the pallet, as viewed looking toward the passenger side end of the seat and pallet;

FIGS. 59, 60, 61 and 62 are photoprint fragmentary perspective views looking downwardly and forwardly toward the left rear corner of the pallet top deck, and illustrating the sequence of manual operation of the pallet latch mechanism to extend it from released, retracted position into locking engagement with the driver seat when seated in the mounted shipping position on the pallet;

FIGS. 63, 64, 65, 66 and 67 are photoprint fragmentary perspective views looking downwardly and rearwardly toward the left rear corner of the pallet top deck, and illustrating the manual operation of the latching mechanism from release to seat engaging position relative to the driver-side of the third row bench seat as mounted for shipping on the pallet;

FIGS. 68 and 69 are photoprint fragmentary perspective views of the front and rear respectively of the front seat row passenger seat as mounted on the pallet and latched thereto;

FIGS. 70 and 71 are photoprint perspective fragmentary views of the front and rear respectively of the front row driver seat as mounted and latched on the pallet;

FIGS. 72 and 73 are photoprint fragmentary perspective views of the front and rear of the passenger side of the third row bench seat as mounted and latched on the pallet;

FIGS. 74, 75 and 76 are photoprint fragmentary perspective views taken at different angles looking toward the front (FIG. 74) and rear (FIGS. 75 and 76) sides of the driver-side of the third row bench seat as mounted and latched on the pallet;

FIGS. 77 and 78 are diagrammatic layout line front and end vertical sectional views taken respectively on the section line 77—77 of FIG. 78 and line 78-78 of FIG. 77, and illustrating the mounting and latching interengagement of the shorter length mid-row "Windstar" bench seat on the pallet of the previous figures;

FIGS. 79 and 80 are diagrammatic layout line end and front vertical sectional views taken respectively on the section line 79—79 of FIG. 80 and line 80—80 of FIG. 79, and illustrating the mounting and latching interengagement of mid-row passenger-side and driver-side bucket seats on the pallet of the previous figures;

DESCRIPTION OF PREFERRED EMBODIMENT
Pallet Seat Loads for Windstar Mini-Van Seating Arrangements Referring first generally to FIGS. 1–13, and by way of background introduction to the construction and use of a shipping pallet constructed in accordance with the present invention, the particular embodiment of such a pallet 120 as illustrated by way of example in these views is particularly constructed and arranged to solve the perplexing problem of accommodating for palletized shipment and storage of fully assembled automative vehicle seats, with only one standardized twin sheet plastic pallet design, the six different seat-to-vehicle mounting structures encountered in providing eight possible different seat layouts as offered to the purchasing public for use in a 1995 model year Ford Motor Company "Windstar" model mini-van. Two of such van seating layouts are shown in FIGS. 3 and 4 respectively.

In FIG. 3, a "Windstar" van 100 is shown in photoprint plan view (with the roof made transparent so that the seating layout is visible from above the van) which consists of a front row driver-side bucket seat 102, a front row passenger-side bucket seat 104, a second row two-passenger bench seat 106, and a third row three-passenger bench seat 108. The front seats 102 are permanently mounted in vehicle assembly on the passenger compartment floor of van 100 by suitable bolts and studs (as discussed in more detail hereinafter). The second and third row bench seats 106 and 108 are each removably mounted on the passenger compartment floor so that one or both can be removed by the van user as desired to alter the passenger and cargo load carrying capacity and configuration of the van interior.

FIG. 4 illustrates another of the eight seating options of the "Windstar" van 100 wherein the second row bench seat 106 has been removed and replaced by a second row driver-side bucket seat 110 and a second row passenger-side bucket seat 112. The second row bucket seats 110 and 112 are also removably mounted on and latched to seat mounting structure provided in the floor of the passenger compartment of the van.

In addition to the foregoing seats, mini van 100 is also designed to accommodate specially constructed second row infant safety seats, one or two of which can be mounted in place of the corresponding second row bucket seats 110 and/or 112, but which have the same seat undercarriage seat-to-floor mounting structure and layout as bucket seats 110 and 112, respectively.

Hence for mini-van 100 there are six basic but individually different seat undercarriage framework configurations. Front row seats 102 and 104 have identical under side framework and floor mounting structures but are not interchangeable between driver-side and passenger-side because of different seat slide latch release bar layouts as well as the additional power operating options offered for the front row driver seat 102. The second row bench seat 106 and third row bench seat 108 likewise have similar seat undercarriage framework constructions and releasable floor mounting feet, but obviously their spacing longitudinally of these seats differs because the second row bench seat 106 is shorter in length than the third row bench seat 108. The second row bucket seats 110 and 112 have releasable floor mounting foot structure similar to that of the bench seats 106 and 108, but each have their two underside frame members lateral spaced apart even less than that of the front row bench seats 102 and 104, and such frame spacing of the passenger side second row seat 112 is slightly less than that of its companion seat 110.

Nevertheless, the preferred embodiment of a shipping pallet 120 provided in accordance with the invention will readily accommodate selectively all six of these van seat undercarriage types, while utilizing a plurality of only one and the same identical pallet 120, thereby enabling a variety of seat loads to be pallet-loaded and shipped in a preselected and predetermined manner to meet the "just-in-time" and diverse seat supply requirements of the automobile vehicle assembly plant.

Thus, as seen for example in FIGS. 1, 7 and 8, a third row bench seat 108 is shown mounted and latched securely onto the top deck 130 of a twin sheet pallet 120 as the sole pallet cargo load when thus palletizing this seat. Seat 108 is shipped with its hinged back 122 folded forward into collapsed position on the bench 124 of seat 108 as shown in FIGS. 1, 7 and 8.

As seen in FIGS. 2, 5 and 6, the same pallet 120 is shown dual loaded with a different van seat cargo, namely the front row driver seat 102 and front row passenger seat 104, each individually mounted upon and securely latched to the pallet ready for transport and delivery to the auto assembly plant and conveyance therein automatically on automated conveyor line equipment all the way to the appropriate assembly line seat installation station.

Preferably the proper individual seat mounting locations on the pallet are readily visually identifiable by the molded-in legends "DRIVER" and "PASSENGER" appearing along the front edge surface 126 of the top deck 130 of pallet 120, as best seen in FIG. 10. Thus, even though front row driver-side and passenger-side seats 102 and 104 could be inadvertently mis-mounted in the passenger and driver mounting locations respectively on pallet 120, the same will be located correctly pallet mounted by observing their labeled locations, thereby also facilitating correct assembly line station pallet unloading and helping insure error-free seat installation in the vehicle.

The second row bench seat 106 (FIGS. 3, 77 and 78), like third row bench seat 108, is mounted on and latched to pallet 120 as a single-seat load, as shown in the diagrammatic cross-sections of FIGS. 77 and 78 (and as discussed in more detail hereinafter).

The second or mid-row driver-side and passenger-side bucket seats 110 and 112 (FIGS. 4, 79 and 80) are typically loaded on pallet 120 as a dual-seat load, similar to front seats 102 and 104, in the appropriate "driver" and "passenger" locations, and more particularly in the manner shown in the semi-diagrammatic illustrations thereof in FIGS. 79 and 80 (also as discussed in more detail hereinafter). The aforementioned optional second row child safety seats may also be palletized as a dual-seat cargo load on pallet 120, and are located, mounted and latched in shipping condition in the same manner as the second row bucket seats 110 and 112.

It is also to be understood that pallet 120 may only have a single-seat load, if desired, for any one of the bucket seats 102, 104, 110, or 112, and also that one of the front row seats 102 and 104 may be paired to create a dual load with the appropriate one of the mid-row bucket seats 110 or 112 on the same pallet 120, if desired.

It will thus be seen that three of the pallets 120 can be individually loaded with the appropriate seat selections to provide the seating layout of FIG. 3 for the "Windstar" mini-van, and likewise for the alternative seating layout of the mini-van shown in FIG. 4. Each of these different seat loads is so identified at the seat plant by removably attaching to label holders at each end of pallet 120 an appropriate bar code and plain language label identifier.

General Construction of Pallet 120

With the aforementioned introductory background in mind, the construction of pallet 120 will now be described. In general, pallet 120 is particularly adapted to be constructed of vacuum moldable material, such as a suitable thermoplastic sheet material, as will be described in more detail later. As will be evident from the drawing figures, pallet 120 comprises a substantially planar load-bearing member of suitable constant thickness and having a very low aspect ratio. Pallet 120 is formed of two separate sheets of material, namely an upper sheet which is used to form the top deck 130 of the pallet, and a lower sheet which is used to form the lower deck 132 of the pallet. These two sheets may be fused together in a conventional twin sheet thermoforming process at a pallet mid-thickness continuous peripheral seam 134 to form a hollow structure. The two sheets of material will thus be largely positioned parallel to each other and separated by the width of pallet 120 itself. Pallet 120 is substantially rectangular in plan and elevations and may be of any suitable standard pallet dimensions, but for the illustrated Windstar van seat shipping use pallet 120 is preferably made 56.00 inches long, 29.00 inches wide, and 3.75 inches thick (as measured between the opposed major planar surfaces 136 and 140 of the top and bottom decks 130 and 132 respectively).

Pallet top deck 130 and bottom deck 132 are preferably formed of high density polyethylene in a conventional twin sheet thermoforming process. In this process, the upper flat starting sheet for deck 130 is seated and formed in an upper mold and then pressed into engagement with the lower sheet of deck 132, which also has been first vacuum thermoformed in a lower mold. Portions of the upper and lower sheets 130 and 132 which are forced together as the separate molds are brought together are fused together at pinch points, known as "knit points", to form an integral continuous double ply plastic part at these knit points. Whereas various plastic materials may be used for the sheets to form twin sheet pallet 120, preferably high density polyethylene (for example, that commercially available as sold under the trademark "PAXON BA 50–100" by Paxon Polymer, and having a density of approximately 0.95 grams per cubic centimeters) provides a preferred material since, in a heated state, it readily and totally fuses with itself and since it takes on heat slowly and releases heat slowly so as to be compatible with the relatively long cycle times required for forming plastic pallets utilizing the twin sheet methodology.

The thickness of the sheets 130 and 1321 may also vary depending upon the application, but a uniform starting sheet thickness of 0.187 inches has been found preferable for the illustrated application of pallet 120.

The upper and lower sheets of decks 130 and 132 are thus fused or knitted at the interface of the peripheral flange portion 134 and at various points elsewhere interiorly of pallet 120 as indicated hereinafter. The generally flat top surface 136 of upper deck 130 merges integrally on all four of its side edges with a vertically dependent peripheral side wall 138. Likewise the generally flat surface 140 of lower deck 132 merges integrally on all four of its side edges with an upstanding peripheral side wall 142. Side walls 138 and 142 meet at the peripheral lip 134, which is thus formed by the edges of the sheet material of decks 130 and deck 132 being permanently fusion joined together around the periphery of pallet 120 at a parting line generally half way between final formed planar surfaces 136 and 140 of the two sheets of the pallet forming material.

This generally flat, hollow clam-shell type construction of pallet 120, with the integral peripheral side walls joined at the center lip 134, provides substantial initial stiffness and compressive stress resistance to pallet 120 adjacent the rectangular periphery of the same. Additional compressive stress resistance or stiffness perpendicular to the major planes of the pallet, i.e., vertically in the conventional orientation of the pallet in use, is obtained primarily by a plurality of additional knit points provided throughout the pallet which are also functionally cooperative as seat foot bearing reinforcements for the variety of automotive seat cargo loads to be carried by pallet 120.

Stacking of Pallets In Nested Relationship

As will be seen in FIGS. 9-17, and particularly in FIG. 13, pallet 120 is quite "thin" having a relatively small, vertical dimension compared to its length and width (i.e., low-aspect ratio). Hence a plurality of empty pallets 120 may be stacked flat one on top of another so as to occupy a minimum of storage or transport space when empty. As indicated in FIG. 13, when the uppermost pallet 120 shown therein is superimposed in stacked relation upon the lowermost pallet 120' shown in FIG. 13, the primarily flat portions of undersurface 140 of lower deck 132, of pallet 120 will rest upon the flat, coplanar portions of the upper surface 136 of upper deck 130 of pallet 120' in generally coplanar, face-to-face abutment to maintain pallets 120 and 120' parallel as stacked.

The broken lines in FIG. 13 extending between the two superimposed identical pallets 120, 120' generally indicate the nesting registrations of the nesting risers and recesses of the top and bottom decks of the associated stacked pallets. Interlock nesting of upper pallet 120 on lower pallet 120' of FIG. 13, so as to prevent relative movement between the stacked pallets in any direction in their mating planes, is thus provided by four upwardly protruding nesting projections on upper deck 130 and four corresponding recesses in lower deck 132 of each pallet 120. More particularly, upper deck 130 of pallet 120 has a pair of risers 138 and 141 formed one at each of the opposite longidutinal ends of the pallet (passenger and driver ends respectively). Risers 138, 141 are generally of trapezoidal shape in elevation and each protrude vertically upwardly above the plane of surface 136 about one inch. Each riser 138, 140 has a horizontally extending flat top surface 142 with three indentations 144 formed therein as stiffeners, and end surfaces 146, 148 inclined at approximately 45° angles to surface 136 in an upwardly mutually convergent direction.

Bottom deck 132 likewise has a pair of corresponding nesting recesses 150 and 152 formed at its longitudinally opposite passenger and driver ends respectively. Each recess 150,152 has a horizontally extending top wall 154 recessed vertically or upwardly from the plane of the major surface 140 of deck 132, a rear vertical wall 156 recessed longitudinally inwardly from the peripheral end wall 142 and a pair of laterally spaced vertical end walls 158 and 160 spaced apart laterally of the pallet a distance slightly greater than the maximum lateral spacing of inclined surfaces 146 and 148 of riser 138.

Thus, as seen in FIG. 13, when upper pallet 120 is lowered to rest its bottom deck 132 upon upper deck 130 of lower pallet 120', with their respective perimeter outlines registered, risers 138 and 141 of pallet 120' will respectively register with and nest in mating recesses 150 and 152 of pallet 120 to lock the two pallets against movement laterally and longitudinally thereof in the mutually abutting major planes of bottom deck 132 of pallet 120 and top deck 130 of pallet 120'. The inclined ends 146 and 148 of each riser 138, 141 assist in slidably cam guiding each riser into the associated recess by engagement with the associated recess and walls 158 end 160 should the pallets be slightly laterally misaligned during registration and superimposition thereof, thereby enabling rapid and rough handling of the pallets when stacking the same.

As also best seen in FIG. 13, pallets 120 and 120' when stacked are further registered and locked against relative movement in the major planes of the pallet by a pair of smaller, generally rectangular risers 160 and 162 centered longitudinally of pallet 120 and which also protrude vertically upwardly from the major surface 136 of top deck 130. Each riser 160, 162 is generally rectangular in plan view and has a flat top surface spaced about one inch above and parallel to the major surface 136 of deck 130. The upper edges of each riser 160, 162 are preferably bevel rounded. Bottom deck 130 of each pallet 120 is also provided with a corresponding pair of nesting recesses 166 and 168 centered longitudinally of the pallet and spaced laterally thereof to index with risers 160 and 162 respectively of the subjacent stacked pallet 120' when pallet end risers 138 and 140 of pallet 120' are nested in their corresponding pallet end recesses 150 and 152 of pallet 120. The longitudinal dimension of the pallet end risers and nesting end recesses 138, 141, 150, 152 extend perpendicularly to the longitudinal dimensions of the pallet center risers and nests 160,162 and 166 and 168 so as to further accurately brace and prevent relative movement of two stacked pallets in any direction in the major planes of the pallets.

General Configuration of Pallet Top Deck

As best seen in FIGS. 10 and 15, the configuration of the top deck 130 of pallet 120 generally subdivides longitudinally into three main areas, namely a longitudinally centered platform area 170 flanked by a passenger-side compartment 172 and a driver-side compartment 174, as respectively indicated by the brackets numbered 170, 172 and 174 in FIGS. 10 and 15. Platform 170 has a flat upper surface 176 coplanar with the main upper surface plane 136 of top deck 130. As indicated in the diagrammatic line layout of FIG. 15, and better seen in the photoprint views of FIGS. 9, 10 and 39–43, compartments 172 and 174 are generally rectangular in plan view and define major seat nesting pockets recessed downwardly from the elevation of platform surface 176 and main deck plane 136 for respectively selectively receiving passenger-side single-person seats 104 or 112 and driver-side single-person seats 102 or 110. Each nesting compartment 172 and 174 is constructed and arranged such that, when the foot seat framework is partially nested and gravitationally secured in its associated compartment of pallet upper deck 130, the nested seats are restrained against relative movement longitudinally and laterally of pallet 120.

Passenger-Side Seat Nesting Compartment of Top Deck

More particularly, and as detail numbered in FIG. 15, passenger-side seat nesting compartment 172 is peripherally defined by opposed generally vertical side walls 180 and 182 spaced apart longitudinally of top deck 130, a pair of coplanar generally vertical front end walls 184 and 186 spaced apart laterally of deck 130, and a pair of coplanar generally vertical rear walls 188 and 190. The central area of compartment 172 is defined by a main flat floor surface area 192 (indicated diagrammatically by the layout line rectangle in FIG. 15) located at an elevation approximately midway between the opposed major planar surfaces 136 and 140 of pallet 120. The horizontal surface areas of compartment 172 at each of its four corners is defined by pocket floors 194,196,198 and 200 located coplanar with one another and recessed below main floor 192 of compartment 172. Three of these corner pockets 194,196 and 198 are further indented toward bottom deck 132 to form pocket recesses 202, 204 and 206 respectively, each of rectangular configuration for respectively receiving seat-mounting pin-plates fixtures 208, 210 and 212.

Passenger-side seat nesting compartment 172 is further provided with front and rear seat mounting nesting platform structures 220 and 222 for nestably receiving the mid-row passenger side bucket seat 112. Front platform 220 has a flat rectangular center top surface 224 coplanar with main surface 136. Flanking center surface 224 are a pair of downwardly recessed seat-foot-receiving support surfaces 226 and 228 disposed coplanar with one another and flush with the floor surfaces of the pin-plate recesses. As better seen in photoprints views of FIGS. 10, 41 and 42, the front platform 220 has inner side walls 230 and 232 vertically dependent from center surface 224 and extending down to the adjacent support surfaces 226 and 228. Surface 228 is flanked by another side wall 234 vertically dependent from a horizontal surface 236 of platform 220, surface 236 being flush with surface 224 and the major surface 136 of top deck 130. Seating surface 228 is also flanked at its front and rear ends by vertically extending and mutually convergently inclined surfaces 238 and 240. Similarly mutually inclined front and rear surfaces 242 and 244 extend from surface 136 elevation down to seat surface 226. The inboard edge of surface 226 is bounded by a slightly raised rib 246.

Platform 220 also includes oppositely inclined mutually convergent surfaces 250 and 252 (FIGS. 41 and 42). A mounting rod/plate fixture 254 is affixed by pop rivets to inclined surface 252.

Rear mounting platform 222 of top deck passenger-side compartment 172 also has two longitudinally spaced apart seat-foot-supporting surfaces 260 and 262 (FIGS. 15 and 18) aligned laterally of deck 130 with seating surfaces 226 and 228 respectively and coplanar therewith. Outboard seat 262 is laterally bounded by vertical side walls 264 and 266 dependent from the horizontal top surfaces 268 and 270 respectively of platform 222, which in turn are coplanar with top deck main surface 136 (see also FIGS. 10, 18, 48, 69 and 73). Downwardly convergently mutually inclined front and rear walls 272 and 274 respectively lead in to support surface 262. Inboard seating surface 260 of rear platform 222 likewise has front and rear downwardly convergent inclined and oppositely facing front and rear walls 276 and 278 leading downwardly into surface 260. The rear side of inclined wall 278 is bounded by another inclined wall 280 leading downwardly to the elevation of surface 200. The inboard edge of surface 260 is bounded by a short raised rib 282. The outboard side of surface 260 is bounded by a side wall 284 which rises slightly to merge with a mid-level floor surface 286 in turn defining a sloping floor surface of a recessed cavity for receiving an upper arm 608 of a pallet latch mechanism (described hereinafter with reference to FIGS. 20 and 49).

Rear platform 222 also has an outboard side wall 288 extending between horizontal surface 270 and recessed horizontal surface 198 to define the inboard boundary wall of the corner pocket in which fixture 212 is mounted. The inboard side wall 282 of platform 222 likewise defines the outboard boundary of seating surface 200. The inboard boundary of seating surface 200 is defined by a vertical wall 290 extending between horizontal surfaces 176 and 200, and, which is staggered relative to compartment wall 182.

Platform 222 also includes cover plate mounting surfaces 300 and 302 progressively recessed slightly below the elevation of the plane of main surface 136 (FIGS. 18 and 20).

Driver-Side Seat Nesting Compartment of Top Deck

Referring to FIGS. 10, 15, 41, 42, 74, 75 and 76, the driver-side seat-nesting compartment 174 of top deck 130 also comprises, like compartment 172, a generally rectangular recessed pocket having flat, fully recessed front row driver-side seat mounting surfaces 310, 312, 314 and 316 defining the four corners of the rectangular pocket. Surfaces 310, 312 and 314 each contain a rectangular recess 318, 320 and 322 respectively with an associated horizontal wall spaced below these seating surfaces (see FIG. 21 relative to mounting of fixture 212). Pin-plate fixtures 324, 326 and 328, identical to fixtures 208–212, are mounted respectively in recesses 318, 320, and 322.

Compartment 174 also has a central platform surface 330 extending horizontally at about mid-elevation between the upper and lower main surfaces 136 and 140 of pallet 120. Surface 330 is laterally flanked by front and rear seat-foot-mounting platforms 332 and 334 respectively for nestably receiving the mid-row driver-side bucket seat 110. Front mounting platform 332 has a horizontal pedestal "porch" surface 336 raised only slightly above surface 330 to provide clearance for the low slung seat release bar 337 of driver seat 102 (FIG. 70). A pair of seat-front-foot support surfaces 338 and 340 are recessed and extend horizontally below the elevation of surface 336, as well as slightly below the elevation of flanking horizontal surfaces 310 and 312.

Front platform 332 also has a central rod-mounting super structure made up of a horizontally extending surface 342 coplanar with main surface 136 and bounded on its front side by forwardly and downwardly inclined surface 344 on which another rod-plate fixture 346 is mounted (see also FIGS. 10, 39, 40 and 70).

The rear ends of seating surfaces 338 and 340 terminate at inclined entrance ramp surfaces 350 and 352 respectively which extend up to pedestal surface 336. The front ends of surfaces 338 and 344 are merged integrally with upright inclined end ramp walls 354 and 356 respectively which extend up to the main horizontal surface 136 of deck 130. The outboard seating surface 338 is bounded on its outboard side by a vertical side wall 358 and at its inboard side by a vertical side wall 360 which rises to surface 342 and to inclined surface 344. The inboard seating surface 340 of platform 332 is bounded on its outboard side by a vertical wall 362 rising to surfaces 342 and 344, and on its inboard side by a slightly raised rib 364.

Referring to FIGS. 15 and 18, driver-side rear mounting platform 334 of compartment 174 for seat 110 has a pair of rear-seat-foot supporting surfaces 370 and 372 that are aligned and coplanar with seat-front-foot supporting surfaces 338 and 340. Platform 334 has a horizontal surface 374 coplanar with main surface 136. Seating surface 372 is bounded by an outboard side wall 376 extending vertically between surface 374 and 372, by inclined downwardly convergent front and rear ramp walls 378 and 380, and at its inboard side by slightly raised rib 382. Seating surface 370 is bounded on its outboard side by a pair of spaced vertical walls 384 and 386 rising on associated rib portions (FIG. 71) and spaced apart by a horizontal clearance surface 388 coplanar with surface 370. Downwardly inclined slightly convergent front and rear ramp surfaces 390 and 392 extend respectively between the opposite fore and aft edges of surface 370 and the front wall of pedestal 344 and the main surface 136 of deck 130. Surface 370 is bounded on its inboard side by a short side wall 394 (FIG. 48) which rises to a slightly inclined bottom wall 396 of a compartment for latch arm 612 (FIG. 18) in turn bounded on its inboard side by a wall 398 rising from wall 396 to upper surface 374 of platform 334. Cover plate mounting surfaces 400 and 402 are provided in recessed relation at the front of pedestal 334 and along the rear edge of deck 130 (FIG. 18). The latch-arm-receiving compartments of the passenger-side rear platform 222 and driver-side rear platform 334 are covered by respectively identical metal cover plates 404 and 406 (FIG. 15) attached by pop rivets to top deck 130.

Central Platform Structure of Top Deck

The central platform area 170 of deck 130 has a latch mechanism cover plate 410 (FIG. 15) mounted by pop rivets at the rear edge of deck 130 on a slightly recessed mounting surface 412 (FIG. 18) of central platform surface 176 and on a slightly recessed surface 414 running along the rear edge of deck 130.

A counterweight cover plate 414 (FIGS. 15 and 17) is attached at the front of edge of deck 130 over a recess compartment 416 having a horizontal floor surface (not shown) recessed downwardly from top deck main surface 136 (FIG. 17). A suitable lead counterweight (not shown) is enclosed within this compartment, if desired, to counterweight the severe pallet-tipping forces created by the aforementioned mid-row child safety seats when mounted on the pallet for transport and storage.

Central platform area 170 of deck 130 also has a pair of stiffening recesses 420 and 422 (FIG. 15) having integral side walls dependent from surface 176 of oval configuration in horizontal cross-section and joined respectively to horizontally extending flat bottom walls 424 and 426 disposed at approximately mid-elevation between surfaces 136 and 140 of pallet 120.

Configuration of Pallet Bottom Deck

Figure 14:
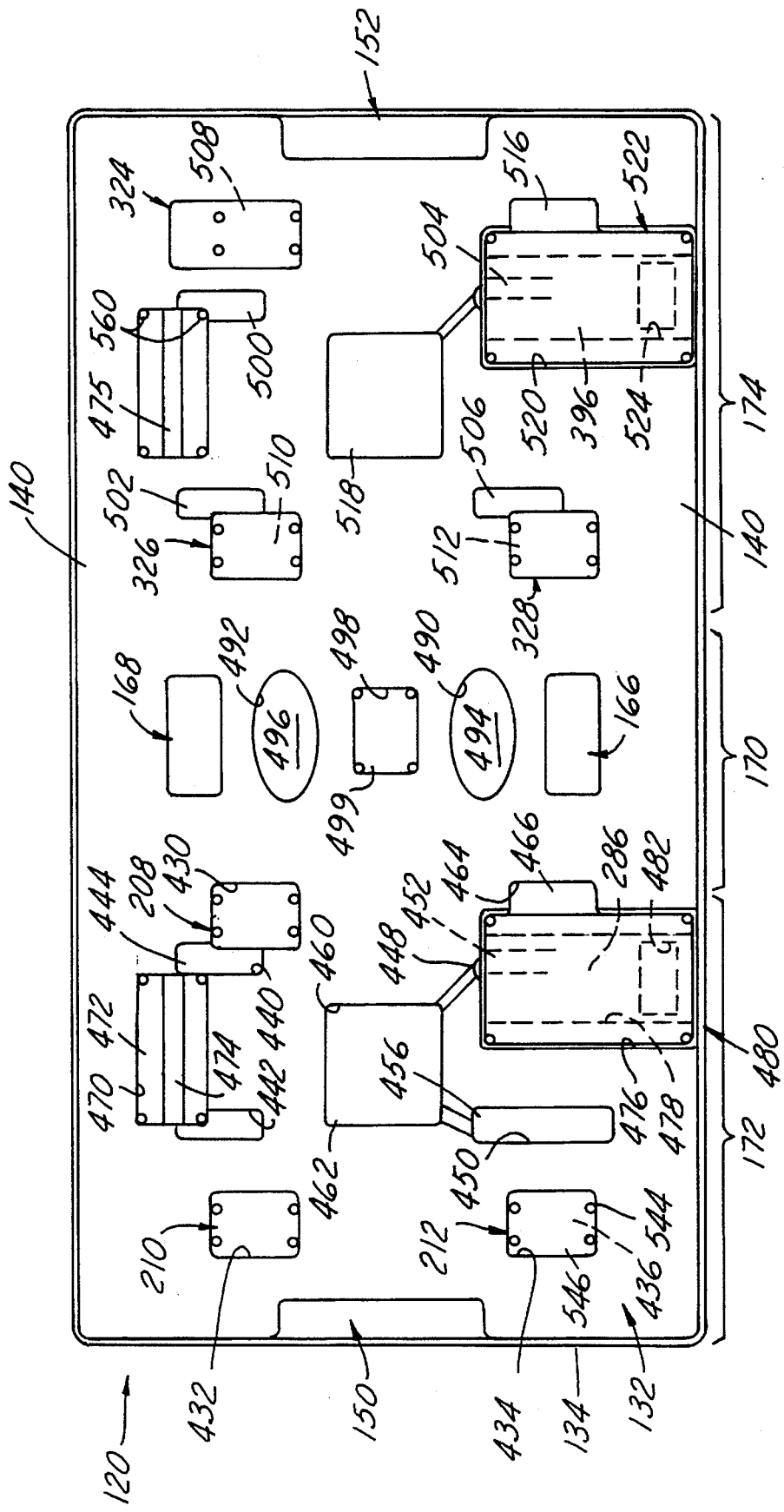
FIG. 14 is a plan view in layout line drawing form to scale, of the bottom deck underside of the pallet of FIGS. 1–13 and oriented in the plane of the drawing identical to the corresponding photoprint view thereof in FIG. 12.

The configuration of the bottom deck 132 of pallet 120 is best seen in FIGS. 11–14, 16 and 17. As indicated in FIG. 14, bottom deck 132 can also be subdivided into the three areas 170, 172 and 174 described previously with reference to the companion FIG. 15 illustrating the layout of top deck 130. The passenger-side zone 172 of bottom deck 132 includes the aforementioned nesting end recess 150, as well as three recesses 430, 432 and 434 individually defining rectangular knit point bosses which protrude upwardly from surface 140 into the hollow interior of pallet 120 and abut in flat face-to-face knit engagement with the corresponding downwardly recessed flat bottom wall of top deck fixture recesses 202, 204 and 206 respectively. Thus, as shown in FIG. 21, the upwardly offset bottom wall 436 of recess 434 of bottom deck 132 abuts flat against the bottom wall 438 of recess 206 of upper deck 130. In the twin sheet thermoforming process of making pallet 120, recess walls 436 and 438 are pressed together while at a sufficiently elevated temperature to cause these two walls to be joined by fusion of the thermoplastic material to thereby establish a "knit" zone in pallet 120 disposed at an elevation approximately midway between the top and bottom major surfaces 136 and 140 of pallet 120. The same "knitting" of the top and bottom decks 130 and 132 is provided between the flat walls of the interiorly protruding bosses of the registering recesses 202/430 and 204/434.

Passenger-side area 172 of bottom deck 132 also includes several further knit boss recesses formed by corresponding integral bosses protruding upwardly interiorly of the pallet from bottom deck 132 to abut face-to-face against and be fusion knitted to the downwardly protruding interiorly protruding bosses formed in upper deck 130 corresponding to the previously described recesses embosssed in the horizontal surfaces of top deck 130. Thus bottom deck recesses 440 and 442 provide flat boss walls 444 and 446 respectively which mate with and are fused to top deck seats 260 and 262 respectively of rear mounting pedestal 222 (FIG. 15). Likewise the bottom deck recesses 448 and 450 are defined by upwardly, interiorly protruding bosses having flat walls 452 and 456 which are knitted to the undersurface of top deck seats 226 and 228 respectively of the front mounting pedestal 220 (FIG. 15). A large rectangular recess 460 likewise defines an upwardly interior offset flat boss wall 462 which is knitted to the undersurface of the main floor 192 of the passenger-side compartment 172 of top deck 130. Another rectangular recess 464 in bottom deck 132 is defined by an interiorly upwardly offset flat boss wall 466 which is knitted to the undersurface of pocket seating floor 200 of top deck compartment 172.

Still another rectangular recess 470 in bottom deck surface 140 is defined by an upwardly interiorly protruding and inclined boss floor 472 which abuts the undersurface of the slanting wall 252 of upper deck platform 220. The knit zone of these mating boss walls also includes complementary longitudinally extending groove walls, generally semi-circular in cross-section, which define a knitted channel 474 (FIG. 14) for receiving and supporting the rod 920/942 of fixture 254.

Bottom deck zone 172 also includes a recess 476 provided with laterally spaced recessed shoulders 478 for supporting a metal cover plate 480 which serves as a retainer and slide plate for a lower latch pin arm 610 described subsequently herein. The ceiling wall 286 of this lower latch arm compartment comprises a double-ply knit wall formed as part of back-to-back recesses in top deck 130 and bottom deck 132'. A cut out through-hole rectangular area 482 in this knit wall provides an access opening through both decks 130 and 132 through which the lower latch arm 610 extends, also as explained in more detail hereinafter.

The central zone 170 of bottom deck 132, in addition to including the aforementioned unknit nesting recesses 166 and 168, includes a pair of oval recesses 490 and 492 defined by upwardly interiorly protruding bosses of deck 132 and having flat end walls 494 and 496 which are knitted to boss walls 424 and 426 respectively of top deck 130. Zone 170 also includes a centrally located rectangular recess 498 for mounting therein of a metal plate 499 to provide a sensor-identifiable target on deck 132.

The driver-side zone 174 of bottom deck 132 is generally constructed as a duplicate repeat of passenger-side bottom deck zone 172. Thus zone 174 of deck 132 is characterized by its main surface 140 having a series of rectangular recesses as defined by upwardly and interiorly protruding bosses with flat seating support knit walls 500, 502, 504 and 506 which respectively are knitted to top deck seating walls 338, 340, 370 and 372. Likewise, additional bottom deck recesses provide bottom deck boss walls 508, 510, 512 and 516 which are knitted to the corresponding upper deck boss walls defining recesses 318, 320, 322 and seating surface 316 respectively. A centrally located square recess provides an upwardly interiorly protruding boss surface 518 which is knitted to platform 330 of upper deck driver compartment 174. A recess 520 constructed identical to recess 476, receives a pop-rivet mounted metal cover plate 522. Another double-ply sloping knit wall 396 has a through-opening 524 cut therethrough to provide lower arm access to the closed compartment defined between plates 522 and wall 396.

Pallet Cargo-Mounting Static Fixtures

Referring to FIGS. 28–38, as well as the previously described FIGS. 9–21, each of the six pin/plate metal fixtures 208, 210, 212, 322, 324 and 326 described previously are identical in construction and separately pre-fabricated for permanent assembly to pallet 120. Fixture 212 is thus illustrative and comprises a stamped metal bracket plate 530 (FIGS. 21, 32 and 33) having a seat mounting platform 532 offset upwardly from a pair of attachment flanges 534 and 536. A cylindrical pin 538, having a bullet shaped nose 540 and cylindrical shank 542, is mounted on platform 532 to project perpendicularly therefrom centrally of the platform, as by butt resistance welding as shown in FIGS. 32 and 33. Alternatively, pin shank 542 is inserted through a hole provided in platform 532 and has a head 544 that abuts the underside of platform 532 and is welded thereto as shown in FIG. 21. The subassembly of bracket 530 and pin 538 is mounted by four rivets 544 inserted through holes in flanges 534 and 536, through the knitted twin sheet plys and then through holes in metal back-up plate 546 which nests in bottom deck recess 534. The diameter of shank 542 is slightly less than that of the shanks of the corresponding vehicle seat fasteners employed in securing front row seats 102 and 104 to the van passenger floor.

The rod/plate fixtures 254 and 346 (FIG. 15) are similar to one another except in lengthwise dimensions. Fixture 346 comprises, as shown in FIG. 34, a thin flat rectangular metal plate 550 provided with rivet holes 552 at each of its four corners. A cylindrical one-quarter inch diameter steel rod 554 is affixed by welds 556 and 558 against the underside of the plate 550 so as to extend longitudinally centrally of the plate. Rod 554 is dimensioned to project beyond the end edges of plate 550 so that its ends 922 and 956 respectively protrude over the associated seating surfaces 338 and 340 of mounting platform 332, as shown in FIG. 15. Plate 550 is secured by pop rivets 560 extending therethrough and the underlying knitted twin plys of the top and bottom decks described previously. Rod 554 is received in the molded-in channel 475 (FIG. 14) similar to channel 474 described previously in conjunction with fixture 254. Fixture 254 is constructed in like manner but is shorter in plate and rod length to accommodate the shorter spacing (approximately six inches) between the pair of top deck seating surfaces 226 and 228 versus the greater spacing (approximately seven and a quarter inches) between the pair of top deck seating surfaces 338 and 340.

Latch arm compartment cover plates 404 and 406 are identical, only plate 404 being shown in FIGS. 28 and 29. Rivet holes are provided at each of the four corners of plate 404 and the plate is secured by pop rivets 560 (FIG. 15) inserted through these holes and through the underlying plastic single ply of top deck 130. One end of plate 404 is offset from the major plane of the plate in the form of an inclined wall 562 and a laterally offset attachment flange 564 to provide a top loose journal retention plate for the underlying latch rod shaft assembly, as best seen in FIGS. 48 and 49. Center cover plate 410 is similarly constructed as shown in FIGS. 30 and 31 and mounted by pop rivets inserted through rivet holes in its four corners to secure the same to the single ply of top deck 130 centrally along its rear edge, as shown in FIG. 15 and better seen in photoprints of FIGS. 10 and 43.

The L-shaped configuration of counter weight cover plate 414 is seen in the detail views of FIGS. 35 and 36. Plate 414 is secured to top deck 130 to cover recess 416 by pop rivets inserted through rivet holes in the four corners of the horizontal portion of the plate and through the underlying single ply of the top deck 130.

Each of the top deck end risers 138 and 140 has fastened thereto a bar code label attachment plate fixture 570 as shown in the side and end elevational views of FIGS. 37 and 38. Label fixture 570 is mounted to top deck risers 138 and 140 as shown in FIGS. 9, 10, 43 and 50, and comprises a rectangular plate 572 with folded back side edge and bottom edge flaps 574, 576 and 578 (FIG. 37). This provides a holder for removable receiving a stiff cardboard-like label having indicia imprinted thereon identifying the particular cargo load carried on pallet 120 bar code. Each pallet and associated cargo load type thus can be identified by conventional automatic bar code reading machinery provided in an automated conveyor system. The bar code labels also afford easy readability by portable scanners when the empty pallets are stacked one upon the other. Fixtures 570 are attached to the single ply of the associated riser by two pop rivets. Additionally, a pair of spring clips (FIGS. 9 and 43) may be attached to flap 576 to assist in retention of a bar code label.

Pallet Latching Mechanism

Referring first to FIGS. 15, 18–20 and 21–31, pallet 120 also includes a pre-fabricated metal latch mechanism subassembly 598 (FIG. 22) permanently installed on the pallet (FIGS. 15 and 18) incorporated in assembly on pallet 120 with cooperative structure to provide a manually operable releasable load-locking latch system, as also seen in photoprint views of FIGS. 9, 10, 43–49 and 59–76. Details of latch mechanism components are shown in the layout line views of FIGS. 22–31. The components of the latching mechanism subassembly 598 include separately fabricated metal components, preferably made from zinc plated steel, and include a one-piece tubular cylindrical shaft 600 (e.g., 1.000 inches in diameter; 0.125 inches wall thickness) having an axial length just slightly less than the overall length of pallet 120, for example fifty one inches, for a pallet 120 having an overall length dimension of fifty six inches. A pair of operating handles 602 and 604, each having a "S" curvature at midlength, and slightly tapering in width (FIG. 24), are welded one to each of the opposite axial ends of tube 600 so as to extend radially therefrom parallel to one another. The curvature at the larger end 606 of handle 602 and 604 matches that of shaft 600 and is mounted so as to be flush with the shaft surface to facilitate rotation of the shaft about its axis and movement axially of the shaft when pallet-mounted, as well as to seal the open ends of the shaft.

As shown in FIGS. 18 and 22, shaft 600 carries a pair of passenger-side latch pin-arms 608 and 610 and a pair of driver-side latch pin-arms 612 and 614. Pin-arm 608 has an arm 616 slightly tapered in width and having a circular opening 618 at its larger end for rotatably receiving shaft 600 therethrough with a close sliding fit, and a semi-circular end surface 620 concentric with the shaft axis in assembly. Pin-arm 608 has a narrow finger portion 622 at its smaller end which carries at its free end a seat latching pin 624. Pin 624 is butt resistance welded to the free end of arm 622 so as to extend with its axis parallel to that of shaft 600 in assembly and oriented on pallet 120 with its conical nose 626 facing the driver side compartment.

Passenger side lower latch pin-arm 610 has a bell crank configuration in elevation as shown in FIG. 26, with its wider upper arm portion 630 having a circular opening 632 for slidably and rotatably receiving shaft 600 therethrough with a close sliding fit in assembly, and a semi-circular surface 634 at its free end likewise concentric with the axis of shaft 600. Pin-arm 610 has a lower, narrower forearm portion 636 extending with its longitudinal axis generally perpendicular to that of upper arm portion 630. A seat engaging pin 638 is resistance butt welded to an upwardly protruding nub 640 at the free end of lower arm portion 636 which extends parallel to the axis of shaft 600 in assembly with its conical nose portion 642 also facing the driver side compartment as oriented on pallet 120.

The passenger side pin-arms 608 and 610 are mounted side-by-side on shaft 600 for rotation relative thereto between a pair of collars 644 and 646 affixed to shaft 600 by welds, the pin-arms being held spaced apart against the collars by a cylindrical sleeve spacer 648 closely encircling shaft 600 therebetween (FIGS. 18 and 22).

Driver-side pin-arms 612 and 614 are similarly mounted side-by-side on shaft 600 between a pair of collars 650 and 652 affixed by welds to shaft 600, and are held spaced apart by a slightly longer cylindrical spacer sleeve 654. Lower pin-arm 614 is identical in construction to pin-arm 610 and carries a pin 656 at its free end extending with its axis parallel to that of shaft 600 and facing in the same direction as pins 624 and 638. Upper pin-arm 612 is substantially identical to arm 608 but carries two pins instead of one, namely an outer pin 658, oriented identical to pin 624 of arm 608, and an inner pin 660 mounted inwardly of the arm from pin 658 as shown in FIGS. 22 and 27 and in assembly facing in the same direction as the remainder of the seat engaging pins. The upper arm pins 624, 658 and 660 are equal in length (e.g., 2.25 inches), and the lower arm pins 638 and 656 are equal in length (e.g., 2.500 inches).

The locking mechanism for the latch assembly 598 is located centrally along shaft 600 under cover plate 410 in the central zone 170 of top deck 120 as assembled to pallet 120. The latch locking mechanism includes a latch pin 670 comprising a cylindrical rod or wire (e.g., 1.25 inches long and 0.375 inches in diameter) welded at one end to the outer surface of shaft 600 so as to protrude radially outwardly therefrom with the latch pin and shaft axes perpendicular to one another. A latch sleeve 672 (FIGS. 22, 23 and 23A) made from a cylindrical tube lays against and is welded to the inner surface of cover plate 410 and slidably receives shaft 600 coaxially therethrough. A latching slot is cut in sleeve 672 as defined by a slot edge surface 674 extending from the right hand end 676 (as viewed in FIGS. 22 and 23) of sleeve 672 parallel to the axis of sleeve 672 and terminating at and merging into a semi-circular latch pin seating surface 678 located at a given distance (e.g., 2.618 inches in a sleeve having an axial length of 3.25 inches) from end face 676. The latching slot is further defined by a helical edge surface 680 leading out tangentially from seat edge 678 back toward sleeve end 676 and terminating at an apex 682 spaced angularly of sleeve 672 from edge 674 by about 100°. A short pin locking seat 684 (FIG. 23A) is defined by a short slot surface extending from apex 682 divergently from surface 680 back toward the other end 686 of sleeve 672 and terminating at a slot surface 686. Slot surface 686 extends axially of the sleeve from the root intersection with locking surface 684 to the sleeve end 676, and is angularly spaced from slot surface 674 by approximately 110° (see also FIG. 18).

Pin 670 is yieldably biased into releasable engagement alternately with slot seat 678 and slot seat 684–686 by a compression coil spring 690 which encircles shaft 600 so as to abut at one end against sleeve end 686 and at the other end against a collar 692 coaxially received on and welded to shaft 600.

Assembly of Latching Mechanism on Pallet 120

Top deck 130 of pallet 120 is thermoformed with a longitudinally interrupted, generally semi-circular upwardly open trench 700, 702, 704 for nestably receiving shaft 600 in assembly on pallet 120 (FIG. 18; also partially seen in FIGS. 10, 48, 49, 69 and 75). Top deck cover plates 404, 406 and 410 and bottom deck cover plates 480 and 522 are installed on pallet 120 after so nesting subassembly 598 on pallet 120.

The subassembly 598 of latching system components as shown in FIG. 22 is first fabricated and permanently assembled in this relationship. Then subassembly 598 is installed in assembled relation with pallet 120 by positioning the same above its assembly position shown in FIG. 18 with the pin arms 608–614 hanging vertically dependent therefrom so that the free ends of lower arms 610 and 614 can be lowered into the assembly holes 287 and 392 (FIGS. 18–20) pin-end-first while the pin ends of the upper pin-arms 608 and 614 are laid loosely on walls 286 and 396 respectively. Then as shaft 600 is lowered into pallet-seated position the lower pin-arms 610 and 614 can be pivoted about shaft 600 to lay in the associated hollow interior spaces below walls 286 and 396 (FIGS. 19 and 20) respectively, bottom deck cover plates 480 and 522 can then be attached to confine the lower pin-arms in these pallet spaces. The free ends of the upper pin-arms 608 and 614 slide on walls 286 and 396 to their position shown in FIGS. 19 and 20. Top deck cover plates 404 and 406 are then assembled and pop-riveted to top deck 130.

When latch system subassembly 598 is lowered to final assembled position on pallet 120, latch plate 410 rests on its mounting surfaces 414 and 412 of top deck 130 with latch sleeve 672 suspended therefrom spaced slightly above the bottom of trench 702, and handle arms 602 and 604 are pivoted about shaft 600 to rest loosely on the associated handle support platform of top deck 130 recessed below main surface 136 (FIGS. 13 and 43). This completes the final assembly of pallet 120 with the latching system permanently installed therein and retained thereon for limited operational axial travel of shaft 600 longitudinally of pallet 120 and for a limited (approximately 110°) rotation of shaft 600 by manually pivoting handles 602 and 604 between their horizontal and (slightly past) vertical positions, as will be described hereinafter in more detail.

Operation of Pallet Latching System

FIGS. 43–49 illustrate pallet 120 in empty, unloaded condition to better show the operation of the latch system of the pallet. FIG. 43 shows latch shaft 600 and associated operating handles 602 and 604 latched in their fully retracted position. In this condition, latch pin 670 seats in the end socket 678 of latch sleeve 672 (FIGS. 18 and 22) due to the biasing force of spring 690 forcing collar 692 and hence shaft 600 to the right (as viewed in FIGS. 18 and 43), thereby forcing pin 670 to fully seated position against seat 678 so as to be held against bodily rotation by latch slot surfaces 674 and 680, thereby latching shaft 600 against rotation. Due to the 90° angular orientation of the axis of pin 670 relative to the longitudinal axis of handles 602 and 604, in the latch retracted position handles 602 and 604 are held angularly locked in their horizontal position resting loosely on the upper surface of the handle platforms of pallet deck 130, as shown inter alia in FIGS. 18 and 43. Hence the built in latching assembly 598 is entirely recessed in retracted position below the elevation of the main surface 136 of top deck 130, and hence does not interfere with the aforementioned stacking of pallets 120 one on top of another (as discussed previously in connection with FIG. 13).

Figure 44:
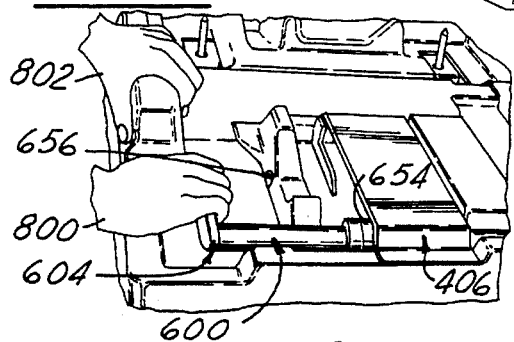
Figure 46:
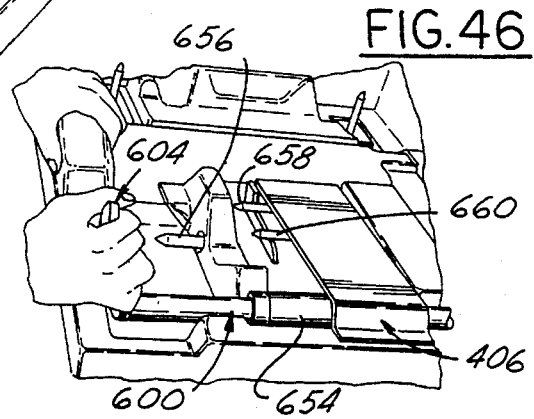
Figure 45:
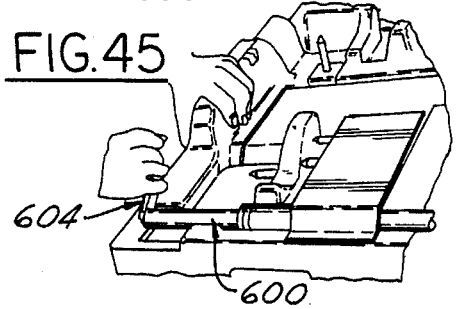
Figure 47:
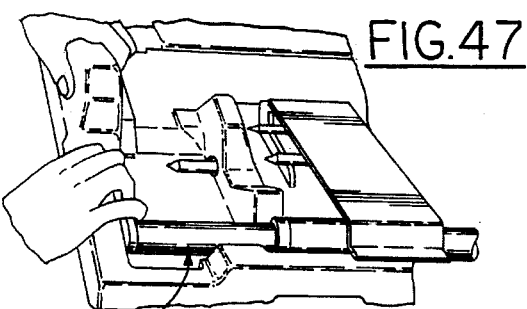

To operate the pallet latching system to seat-load-engaging mode, an operator can use either handle 604 or handle 602. If driver-side handle 604 is selected, as shown in FIG. 44, the operator grips it with one hand 800 while, if desired or necessary, steadying pallet 120 against movement with the other hand 802. Handle 604 is then pulled to the left as viewed in FIG. 44 while simultaneously gradually rotating handle 604 clockwise (as viewed in FIG. 43). This will cause movement of shaft 600, and hence pin 670, to the left as viewed in FIG. 18, while permitting such gradual clockwise rotation of shaft 600 as pin 670 slides along inclined latch slot surface 680. When pin 670 reaches apex 684 at the left hand end of slot surface 680, handle 604 will have been rotated clockwise through approximately 90° of rotation, past the intermediate position shown in FIG. 45, to the upright position shown in FIG. 46. This axial motion of shaft 600 to the left will pull all four of the latch pin-arms 608–614 along with the shaft, thereby extending all five of the associated latch pins in both the passenger side and driver side compartments from their fully retracted positions shown in FIGS. 18, 43 and 44 to their fully extended positions shown in FIG. 46.

Then handle 604 is free to be rotated further clockwise for bodily rotating latch pin 670 past slot apex 684 through a final, approximately 10°, increment of shaft rotation, while maintaining pulling force with hand 800 to the left (as viewed in FIGS. 45 and 46) until latch pin 670 is registered with the locking slot root surfaces 684 and 686 of locking sleeve 672 (FIGS. 23 and 23A). Then pulling force on handle 604 is relaxed to allow spring 690 (which has been compressed by pulling shaft 600 to the left), to expand and force shaft 600 to the right, thereby forcing pin 670 into its locking notch root of slot surfaces 684 and 686 of sleeve 672. As pin 670 rides over apex 684 and into this locking notch, shaft 600 will be moved by spring 690 a short distance to the right corresponding to the axial length of the locking notch (e.g., approximately 0.015–0.020 inches). Hence all of the locking arm pins will likewise be moved in a retraction direction only this short distance, and hence will remain substantially fully extended in their load-locking position shown in FIGS. 48 and 49. Handle 604 can then be released and shaft 600 now will be held releasably locked by the biasing force of spring 690 in this seat-load-retaining position shown in FIGS. 48 and 49.

To operate the pallet latching system from seat-load-locking to seat-load-unlocked condition, the foregoing locking operational sequence is performed in reverse. Thus, handle 64 is gripped and pulled to the left as viewed in FIGS. 18 and 43, thereby pulling shaft 600 slightly to the left to pull pin 670 out of the locking notch of sleeve 672. Then handle 604 is rotated counterclockwise as viewed in FIG. 48 until pin 670 has cleared apex 682 of locking sleeve 672. Then handle 604 can be released, if desired, and it will be rotated approximately 90° down to the position of FIG. 47 as shaft 600 is axially retracted to the right solely by spring biasing force, and likewise simultaneously rotated counterclockwise by pin 670 riding down the inclined slot cam surface 680. Thus such release of handle 604 allows spring 690 to force shaft 600 to the right to the retracted and locked position of FIG. 43. It will be noted that the end limit of axial motion of shaft 600 in the aforementioned left hand direction is ultimately limited by the abutment of the lower pin-arms 612 and 614 against the interior surfaces of the lower arm compartments, inasmuch as these pin-arms, although relatively rotatable pivotally on shaft 600, are fixed against axial movement relative to shaft 600.

It will be understood that if the passenger-side latch operating handle 602 is selected to operate the pallet latching system, the operator exerts pushing instead of pulling forces on handle 602 in performing the aforementioned operational sequence.

As best seen in FIG. 48, the driver-side compartment is provided with a circular cut-out opening 804 in side wall 389 adjacent seating platform 316 through which pin 656 of lower arm 614 protrudes slightly when in retracted position (FIG. 43), and protrudes fully when in seat-locking position (FIG. 48). Likewise, the passenger-side compartment (FIG. 49) is provided with a similar circular opening 806 in wall 284 adjacent seating platform 200 through which pin 638 of lower arm 610 protrudes slightly when in retracted, fully when in extended positions. However the slight protrusion of pins 656 and 638 over associated surfaces 316 and 200 in the latch retracted condition of FIG. 43 is non-interfering with the structure of those van seats utilizing pallet seating surfaces 316 and 200.

Loading and Locking Seats on Pallet 120

Loading of Front Row Passenger Seat 104

The construction of the seat supporting undercarriage framework of front row passenger-side seat 104 is best seen in the views of FIGS. 50–52, 59–62 and 68–71. It will be seen that seat 104 has laterally spaced apart "outboard" and "inboard" (the terms "inboard" and "outboard" being used with reference to their orientation on the seat in the van in use) frame side walls 810 and 812 made as sheet metal stampings and each have an in-turned peripheral flange formed at fore and aft spaced locations along its lower edge to provide front and rear seat foot portions. Outboard seat frame side 810 thus has a flat horizontal rear foot portion 812 (FIG. 52) in which a seat mounting bolt or stud opening 816 is provided (FIG. 52). Inboard seat frame 812 likewise has a flat front-foot flange portion 814 in which a similar seat mounting bolt opening 818 is formed. The inboard rear foot portion 820 of the flange of inboard frame side wall 812 is seen in FIG. 69, along with the associated seat mounting bolt hole 822. The outboard frame flange of seat 104 likewise has a flat rear foot portion and associated mounting bolt opening (not shown).

To load seat 104 on pallet 120, seat 104 is manually positioned generally as shown in FIG. 50 above the pallet to orient the under frame side walls 810 and 812 vertically above the associated seat supporting structure of the passenger side compartment 172 of deck 130. The latching system is in the retracted and locked condition and position of FIG. 43, as described previously. Then, as shown in FIGS. 51 and 52, the inboard and outboard rear feet portions of seat 104 are lowered downwardly toward deck 130 to register mounting pin 538 of fixture 212 with the mounting bolt hole in the associated outboard rear foot flange of seat 104. Next the rear of seat 104 is lowered down onto deck 130 so that pin 538 is thereby inserted through the seat bolt opening. When seat foot flange 822 (FIG. 52) rests on plate platform 532 of fixture 212, pin 538 protrudes upwardly through flange portion 822 as seen in FIG. 52. The rear inboard foot flange 820 of seat 104 is simultaneously rested directly upon platform 200 of deck 130 (FIGS. 53 and 69), and thus does not have a pallet mounting pin registering with inboard flange portion 820.

Seat 104 then may be pivoted down from the position of FIGS. 51 and 52 to the fully seated position shown in FIGS. 53, 68 and 69, thereby causing pallet pins 826 and 828 of front fixtures 208 and 210 to register with and protrude upwardly through the associated mounting holes 818 and 816 of seat front foot flanges 814 and 812 respectively, as best seen in FIG. 68. The flange foot portions 814 and 812 of seat 104 now rest on the plate platforms 532 of these respective seat mounting front fixtures.

When seat 104 is so drop-mounted on top deck 130 in nested relation in passenger-side compartment 172 of pallet 120, seat 104 is securely supported and gravitationally held against movement laterally and longitudinally of pallet 120 by the three seat-registering mounting pins 538, 826 and 828.

Latch Locking of Passenger-Side Front Seat on Pallet

Next, and referring to FIGS. 59–62 in sequence, the latch assembly 598 is operated in the manner described in conjunction with FIGS. 43–49 to extend the seat latching pins from retracted to fully extended and then latch-lock extended position. This will cause latch pin 638 of lower pin-arm 610 to be moved to a seat locking position spaced closely above foot flange 820 of seat 104, and near the forward edge thereof, as best seen in FIGS. 68 and 69. It will be noted that the upper arm latching pin 624, although simultaneously extended to its seat locking position, preforms no seat locking function in this operation of latching the front passenger seat 104 to pallet 120.

It will be further noted that, once so latched by pin 638 to pallet 120, seat 104 is restrained against upward vertical movement relative to deck 130 solely by pin 638. Although seat 104 is not directly restrained against upward motion relative to deck 130 at its front feet, forces tending to lift seat vertically upwardly from deck 130 in a direction perpendicular deck surface 136 are directly resisted by rear foot flange 820 being lifted into abutment with pin 638. If forces are exerted on seat 104 tending to tilt the same forwardly of pallet 120, the same restraining action is provided by pin 638, and likewise as to forces tending to tilt seat 104 sideways either clockwise or counterclockwise as viewed in FIG. 68. If forces are exerted on seat 104 tending to tilt the same backwardly, i.e, from the position of FIG. 68 toward the position of FIGS. 51 and 52, the forward spacing of pin 638 so as to overlie the forwardmost portion of the foot flange 820 will cause the flange to abut pin 638 as the seat is pivoted about the rear portions of rear foot flanges 820 and 822 where they will then respectively bear as pivot points upon the support plate of fixture 212 and the surface of seat platform 200. Hence such upward rearwardly tilting forces exerted on the seat 104 can only produce a limited amount of such pivotal motion of seat 104, which is insufficient to deregister the seat with the front fixed pallet pins 826 and 828. In addition, further resistance to such rearward tilting forces is provided by these front pins 826 and 828 since they provide interference with the forward margins of the bolt mount holes of seat front feet 814 and 812 respectively during such tilting motion. Seat 104 is restrained from movement forwardly of deck 130 during such tilting by rear pallet pin 538 registering with the mounting hole in foot 822 to thereby insure retention of such interference engagement of front pallet pins 826 and 828 to resist rearwardly tilting forces.

It will thus be seen that with front passenger seat 104 so mounted upon and latched to pallet 120, the same is securely retained in all directions against movement relative to pallet 120. Hence seat 104 is held on pallet 120 in a manner to withstand severe tilting of pallet 120 during truck or rail transport and also while moving on severly inclined automated conveyor systems, as well as the jolts and shocks of rough handling often encountered in normal handling of loaded pallets. When pallet 120 with seat 104 so loaded thereon is delivered to the vehicle assembly line station, the same is easily and rapidly removable from pallet 120 by reversing the sequence of the foregoing latching and loading procedure.

Pallet Loading and Latching of Front Driver Seat 102

Driver seat 102 is loaded on the driver-side compartment 174 of pallet 120 so as to be positioned in the loaded and latched position seen in FIGS. 2, 5 and 6. The latch locking procedure for seat 102 is shown in sequence in FIGS. 59–62, and the latched and locked condition of seat 102 or pallet 120 is shown in more detail in FIGS. 70 and 71.

Driver seat 102 may be dropped mounted onto pallet 120 following the same sequence and procedure described previously with respect to passenger seat 104, but with driver seat 102 properly vertically aligned over its associated driver-side mounting compartment 174 of top deck 130. Seat 102 is thus lowered onto deck 130 into fully seated registry therewith to insert seat mounting pins 832 and 834 of front fixtures 208 and 210 respectively through the seat mounting holes 836 and 838 of seat front foot flange portions 840 and 842 respectively as seen in FIG. 70. The outboard rear foot flange 844 of seat 102 now rests flat upon the compartment seating wall 316 of deck 130 as seen in FIG. 71. Likewise, seat mounting pin 846 of rear fixture 328 registers with and protrudes through the mounting bolt hole in rear inboard foot flange of seat 102, as partially seen in FIG. 59. Seat 102 thus has a three-point pin engagement with deck 130 of pallet 120, like passenger side seat 104, and is thus securely gravitationally held by the driver-side pallet pins against movement laterally and longitudinally of pallet 120.

Driver seat 102 is then latched down onto pallet 120 by extending the latch system from its fully retracted, stored position to its latched and locked position as described previously in conjunction with FIGS. 43–49. This procedure is again illustrated with reference to seat 102 in FIGS. 59–62. It will be seen that as latch shaft 600 is pulled from its fully retracted position shown in FIG. 59, while also first rotating handle 604 a quarter turn clockwise (as viewed in FIG. 59) and then further rotating the handle through the last 10° increment to its latch and lock position shown in FIG. 62, the associated lower arm seat latching pin 656 is moved from retracted position to a position extended above outboard rear foot flange 844 (FIGS. 62 and 71), spaced slightly thereabove and near the forward end of the same (e.g., about one and half inches forwardly of the location of the unoccupied seat mounting hole 846 of foot 844). Again, when so latched on pallet 120, driver seat 102 is fully restrained against upward lifting forces tending to vertically separate the same from deck 130, and is also restrained against movement laterally and longitudinally relative to deck 130. Forces tending to tilt seat relative to pallet 120 are resisted in same manner as described relative to seat 104. Also, again it will be seen that upper arm latch pins 658 and 660 (FIG. 71), although concurrently extended to a seat latching position, do not perform a seat latching function relative to seat 102.

Driver seat 102 is unlatched and unloaded from pallet 120 by performing in reverse the sequence described in conjunction with latching and loading of the same on the pallet.

Mounting and Latching of Third Row Bench Seat on Pallet

As best seen in FIGS. 54 and 55, third row bench seat 108 has an undercarriage including laterally spaced passenger-side and driver-side support frame subassemblies 900 and 902 respectively. The front feet of seat 108 comprise C-shaped brackets 904 and 906 respectively attached to frames 900 and 902 and respectively having a forwardly opening central slot 908 and 910 for receiving the associated van seat-mount rods which are recess mounted into the floor of the passenger compartment of the van (not shown). The two rear feet of seat 108 comprise releasable latch mechanisms 912 and 914 of identical construction and respectively attached to frames 900 and 902. Each latch mechanism 912,914 has an operating handle 916 for pivoting a claw 918 (FIG. 55) of each latch between a closed position for trapping associated van floor rods and an open position for disengaging the rear feet from the floor rods. When the rear claws are so released seat 108 may be tilted forwardly to lift the rear of the seat, and then the seat is pulled back to release front claws 904 and 906 from their associated floor rods. Seat 108 is releasably mounted in the van by performing this reverse sequence in reverse.

As best seen in the sequence of views of FIGS. 56, 57 and 58, seat 108 is drop mounted onto pallet 120 by first aligning seat 108 vertically above the pallet with front foot 904 the passenger-side frame 900 positioned above deck 130 and generally aligned and resting on the rear surface of front pallet seat 228 in the passenger-side compartment 172, with seat rear foot 912 elevated above rear pallet seat 262 as shown in FIG. 36. The driver side feet 906 and 914 are likewise oriented vertically with driver-side compartment pallet seats 338 and 370 respectively, with the front foot 906 resting on the rear surface of seat 338 and rear foot 914 held up off deck 130 above pallet seat 370.

Then seat 108 is slid forwardly from the position of FIG. 56 to the position of FIG. 57 to thereby cause the outboard protruding ends 920 and 922 of the pallet rods of fixtures 254 and 346 to be respectively received in open slots 908 and 910 of seat foots 904 and 906. Seat 108 is so slid forwardly until abutted against compartment walls 238 and 354 of seats 228 and 338 respectively. Seat 108 is then pivoted downwardly to rest rear feet 912 and 914 on deck seats 262 and 370 respectively, claws 18 remaining spring biased into closed condition so that the rear of the seat rests on the bottom surface of each of these closed claws. Seat 108 when so drop-mounted and engaged with pallet 120 is gravitationally held against movement laterally and longitudinally relative to pallet 120' in three directions, namely from side-to-side and forwardly of the pallet.

Figure 66:
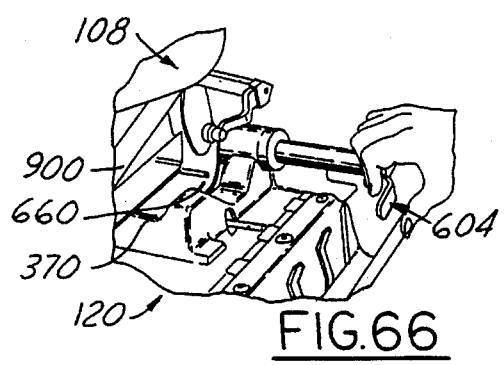
Figure 67:
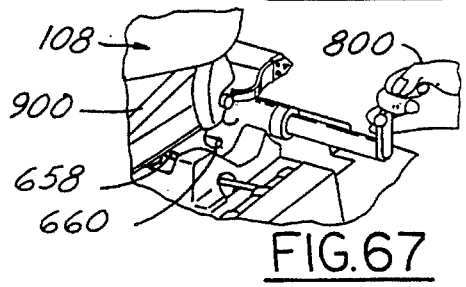

Bench seat 108 is then latched-locked to pallet 120 following the sequential latching procedure for this seat as described previously and as shown in FIGS. 63–67, which is the same procedure used for all seats. Movement of latching shaft 600 from its retracted position of FIG. 63 through the positions of FIGS. 64 and 65 to the fully extended position of FIG. 66 thus causes pin 660 of upper latch arm 612 to move from its retracted position to its full extended position wherein pin 660 registers with and protrudes through the closed claw slot of rear foot latch 914 as seen in FIGS. 66 and 67.

As so latched and locked on pallet 120 as shown in FIGS. 72–76, seat 108 is restrained by pin 660 against movement rearwardly on the pallet. Hence, seat front foot claws 904 and 906 are now fully trapped in engagement with pallet rod ends 920 and 922 respectively to thereby restrain seat 108 against forces tending to lift the same upwardly and/or tilt it backwardly relative to pallet 120. Tilting forces in the opposite direction, tending to tilt seat 108 forwardly relative to pallet 120, are restrained by pin 660 engaging claw 918 of latch 914. Thus, when so mounted and latch/locked to pallet 120, bench seat 108 is securely retained thereon against movement relative to pallet in all directions. As so loaded, pallet 120 can be transported, handled and conveyed through severe tilting and inclined motions encountered on automatic conveyor system and in handling by other pallet transport equipment without danger of seat 108 becoming loose from pallet 120.

Seat 108 is readily unloaded at the vehicle assembly line station in the same manner as all the remaining seats discussed herein, namely, by reversing the latching procedure to first release the seat, then return the latch to retracted position, and then remove the seat from pallet 120 by performing the sequence of FIGS. 56, 57 and 58 in reverse, i.e., slide seat 108 backwardly to free it from the front foot rods whereup the seat is free to be lifted completely off of pallet 120.

It also is to be understood that the remaining pins, although also all moved to their extended positions in the latched/locked condition, do not engage or perform any latching function relative to bench seat 108, but can be moved from their retracted to extended positions without interference from the structure of seat 108, when so mounted on pallet 120.

Pallet Mounting and Latching of Mid Row Bench Seat

Referring to FIGS. 77 and 78, mid-row bench seat 106 has an under carriage construction identical to seat 108 except that the passenger-side underframe 930 thereof is spaced about 7½ inches closer to the driver-side underframe 932 thereof than the spacing of underframes 900 and 902 of rear-row bench seat 108. Hence, when drop mounting bench seat 106 on pallet 120 the driver-side seat frame 932 is aligned with the pallet in the same manner as driver-side frame 902 of seat 108 to thereby rest its front and rear feet nestably in and on front and rear pallet seats 338 and 370 respectively. However, the passenger-side underframe 930 is aligned vertically with and seats nestably on passenger compartment deck seats 226 and 260.

Thus when so mounted, mid-row bench seat 106 has the protruding rod end 922 of fixture 346 registered within open slot 934 of its driver-side front foot claw 936 (FIG. 77). However, passenger-side frame 930 has its front foot claw 938 positioned to register the open claw slot 940 with the protruding rod end 942 at the inboard side of fixture 254. Likewise, rear foot 944 of frame 930 has its closed claw resting on seat 260 (FIG. 78) at the inboard side of platform 222. Thus, when the latching system is moved from released to latch/locked position, pin 624 of upper latch pin-arm 608 moves into registry with and protrudes through the floor-rod receiving gap of the closed passenger-side rear claw 944 of seat 106 to thereby secure seat 106 in fully locked condition on pallet 120. Additionally, seat 106 is also latched at the rear by a second pin, namely pin 658 of pin-arm 612 entering the floor-rod-receiving gap of the driver-side rear claw (not shown) of seat 106. The associated pin 660 of pin-arm 612 clears this rear seat claw of seat 106 (and all other structure of this seat) when the same is extended with pin 658.

The mid-row bench seat 106 is thus held against movement in all directions relative to pallet 120 by its seated engagement in the pallet seats, the two front feet individually engaging rods ends 922 and 942 and the two rear feet being held by pins 624 and 628. Hence, although the seat-to-pallet alignment differs slightly, the mounting and demounting procedure for the mid-row bench seat 930 relative to pallet 120 is the same as that for the rear bench seat 108 despite the different seating positions of the passenger side underframes of these respective seats.

Pallet Mounting and Latching of Driver-Side Mid-Row Bucket Seat

Referring to FIGS. 79 and 80, since the driver-side mid-row bucket seat 110 is also a user-removable seat, the same has outboard and inboard seat frame support assemblies 946 and 948 respectively which are identical in construction to the seat underframes 932 and 930 of mid-row bench seat 106 and underframes 902 and 900 of third row bench seat 108. However, frames 946 and 948 are laterally spaced apart by a much shorter distance than those of the bench seats, and with a lateral spacing unique to this seat. Hence, in drop-mounting seat 110 on pallet 120 the same is vertically aligned over the driver-side compartment 174 of deck 130 with the outboard front foot claw 950 (FIG. 80) over the rear portion of pallet seat 338 of front platform 332 and with its inboard front foot claw 962 aligned with the rear portion of pallet front seat 340 of platform 332. The outboard rear latch claw (not shown) of seat 110 is aligned with deck seat 370 of platform 334, and the inboard rear latch claw of seat 110 (not shown) is aligned with deck seat 372 of platform 334. Seat 110 is then lowered front-end-first onto pallet 120 similar to the procedure with seat 108 (FIGS. 56–58), and shoved forward as far as it will go in the seating compartments to bring rod end 922 of fixture 346 into protruding registry with the open slot 954 of foot claw 950 (FIG. 80) and likewise to bring the protruding rod end 956 of fixture 346 into protruding registry with open slot 958 of inboard foot claw 952 of seat 110. Seat 110 is now positioned for latching and locking onto pallet 120.

When the latch system 598 is moved from retracted to latched and locked condition as described previously, latch pin 658 of upper latch pin-arm 612 is moved into locking registry with the outboard rear closed claw slot of seat 110. The position of pin 658 in such seat locking condition is seen in FIGS. 66 and 67 wherein pin 658 is seen positioned spaced above an empty deck seat 370. Although the rear inboard foot claw of seat 110 is not engaged by any latch mechanism pin, nevertheless seat 110 is now securely nested and locked against movement in any direction relative to pallet 120 for transport of the pallet so loaded through various tilting and inclined orientations normally encountered in service, as described previously. Again, unlatching and unloading of seat 110 from pallet 120 is performed by following the same procedure as that performed with all of the user-releasable type seats 106,108 and 112 provided for van 100.

Pallet Mounting and Latching of Passenger-Side Mid-Row Bucket Seat

Passenger-side mid row bucket seat 112, as also shown diagrammatically in FIGS. 79 and 80, likewise has inboard and outboard seat underframe support assemblies 960 and 962 respectively constructed identically to the corresponding supports 900 and 902 of seat 108. However, the lateral spacing of underframes of 960 and 962 is unique to seat 112, the same being even more closely laterally spaced apart than those of seat 110. Hence, the passenger-side front and rear platform 220 and 222 of compartment 172 of deck 130 provide a pair of front seats 226 and 228 and rear seats 260 and 262 spaced to uniquely to accommodate van seat 112 on the passenger-side of pallet 120. When the four feet of van seat 112 are oriented above these corresponding pallet seats seat 112 is drop-mounted in the manner of the other user-releasable-type van seats 108,106 and 110, i.e., in the manner of FIGS. 56–58. This causes rod end 942 (FIGS. 79 and 80) to protrude into the open slot 964 of the inboard front foot claw 966 of seat 112, and likewise registers rod end 920 in the open slot 968 of outboard front claw 970 of seat 112.

As seat 112 is thus shoved forwardly on pallet 120, it, like seats 108, 106 and 110, abuts against the associated pallet seat compartment front end walls, i.e., in this case, walls 238 and 242 (FIG. 15). The closed slot of the inboard rear seat foot claw 970 (FIG. 79) of inboard side frame 960 of seat 112 is thereby brought into alignment with the travel path of latch pin 624 of upper latch pin-arm 608. Hence when latching system 598 is shifted from release retracted to latched/locked condition as described previously, pin 624 protrudes into the closed claw slot of seat foot 970 to thereby fully lock seat 112 onto pallet 120, with it so nested and latched, against movement in all directions relative thereto. The position of pin 624 over the associated compartment seat 260 (when empty) is best seen in FIG. 73. Again, unlatching and demounting of seat 112 from pallet 120 is performed identically to that of the other user-removable van seats 106, 108 and 110.

Although not shown, the mid row removable child safety seats provided for van 100 for user-removable driver-side and passenger-side van mounting respectively have undercarriages constructed identical to those of seats 110 and 112 respectively, and hence are mounted, latched, unlatched and demounted from pallet 120 in the same manner as seats 110 and 112.

Advantages

From the foregoing it will now be understood that the exemplary but preferred embodiment of a pallet 120 constructed in accordance with the invention amply fullfills the aforestated objects and provides numerous advantages for transport shipment movement on live-roll automated conveyors and storage of both loaded and empty pallets, particularly in handling of automotive passenger seats between the seat manufacturing facility and the automotive vehicle assembly line. It will now be seen that one and the same pallet 120 can readily accommodate a wide variety of seat load configurations. Moreover, each of these different seat loads is latched and locked onto pallet 120 utilizing only one latching system and one latching procedure. This feature greatly contributes to achievement of significant cost savings in both pallet manufacture and use.

The twin sheet thermoplastic construction of pallet 120 provides a strong and durable low aspect ratio load supporting structure of economical manufacture having a high strength-to-weight ratio. The automotive seat loads, although bulky, heavy and having a high-aspect ratio, are nevertheless safely carried on pallet 120 in a secure and stable manner since they are pallet nested and locked at their strongest areas as designed for ultimate end-use in the vehicle, namely, on their support feet. They are thus also oriented on pallet 120 in the same manner intended for end-use, thereby further reducing likelihood of cargo seat damage during palletized shipment and storage.

Pallet 120 is capable of reliable operation over an extended service life, but when eventually damaged by severe usage as to be no longer be of useful service, the same can be economically recycled by recycling machinery which pulverizes the twin sheet plastic material and in this process removes all of the metal fixtures mounted on the pallet. Most often many of the more rugged metal fixture components of pallet 120 can be salvaged for re-use. This recycling debris can be readily separated to segregate the plastic material from the metal components, the metal debris being either recyclable for re-use as is or in conventional scrap metal recovery processes if scrapped, and the thermoplastic material being thus made available for regrinding and reuse in forming starting plastic sheet material for manufacture of another pallet.

The large flat bearing area provided by the bottom surface 140 of pallet bottom deck 132 enables the pallet, whether empty or loaded, to move smoothly and easily over conveyor rolls and conveyor line gaps in automated pallet conveying and handling equipment. The smooth side and end surfaces defining the pallet periphery, and the absence of laterally or longitudinally pallet load protrusion of overhang, are further features also highly compatible for safe and reliable loaded or empty pallet conveyance through such equipment. Pallets 120, being flat and rectangular in overall configuration, and having a very low aspect ratio when empty, are readily stackable in a nested, compact and secure storage array, thereby further reducing storage and return shipment costs as well as likelihood of damage to the empty pallets.

The bar code labels removably attached to the label plate holders on the end risers 138, 140 of top deck 130 enable the pallet to be automatically selected, sorted and conveyed on automatic conveyor equipment with each pallet separately identified, and the load type thereon likewise being identifiable and selectable for automatic conveyor delivery to the appropriate assembly line station. Moreover, the metal (steel) bottom plates of the static pallet pin fixtures 208, 210, 212, 324, 326 and 328 (as seen in FIG. 12 and identified in FIG. 14) are provided as optional adjuncts which enable ferromagnetic sensors in the conveyor system to further identify the location of the pallet on the conveyor for movement and positioning of the pallet as needed. Indeed, a center plate 499 is mounted in underside recess 498 with pop rivets solely for this conveyor sensor identification purpose. Also, the latch arm compartment cover plates 480 and 522 are likewise made of steel to facilitate pallet sensing by either ferromagnetic sensors or photosensors. However, it is also to be understood that, if such pallet sensors are not employed in the conveying system, the bottom plates of the static pin fixtures can be eliminated and the top deck portions of these components directly riveted to the twin sheet plastic material at these pallet knit points. Likewise, cover plates 480 and 522 in such instance may be made of plastic material, if desired.

The three dimensional nesting configuration and geometry provided in the seat mounting structure of the passenger and driver sides compartments of top deck 130, in conjunction with the three dimensional upwardly embossed configuration of bottom deck 132 with its aforementioned knit point bosses, cooperate to provide a high strength-to-weight ratio beam structural strength to pallet 120 thereby enabling it to securely and reliably support the heavy seat loads under adverse handling conditions. Hence only the two center oval knit points at 426/494 and 424/496 need be added to serve as the only two non-cargo load bearing knit points in pallet 120. The remaining knit points serve the dual function of stiffening the pallet and directly reinforcing the pallet seats for vehicle seat-foot loading thereon.

It also is to be understood that the counterweight compartment 414 and associated structure may be omitted for all seat loads for van 100 in the event the aforementioned special child safety seats (not shown), with their pallet-destablizing offset center-of-gravity are discontinued by the vehicle manufacturer.

The location of the passenger and driver seats on pallet 120 as oriented thereon in their in-use relationship in the van, and with their pallet locations clearly and permanently labeled with the molded-in legends "passenger" and "driver", greatly facilitates both proper loading of the pallets at the seat manufacturing facility and fast unloading of the pallets and correct assembly installation of the off-loaded seats into the vehicle at the auto assembly plant, with respect to both the bucket seats and bench seats.

The vehicle seat carrying pallet of the invention has thus enabled the vehicle manufacture to enjoy substantial cost savings in vehicle manufacture while simultaneously improving the environmental aspects of automotive supplier cargo shipment.

It is also to be understood that, although the foregoing description and drawings describe and illustrate in detail various preferred embodiments of the present invention, to those skilled in the art to which the present invention relates the present disclosure will suggest many modifications and constructions as well as widely differing embodiments and applications without thereby departing from the spirit and scope of the invention. The present invention, therefore, is intended to be limited only by the scope of the appended claims and the applicable prior art.

We claim:

1. A plastic pallet for supporting thereon in a free-standing manner a cargo load having a high aspect ratio and support feet constructed to support the cargo load in use, said pallet comprising:

a planar load bearing twin sheet hollow pallet member normally oriented with its major plane generally horizontal in use and being formed from upper and lower sheets of thermoplastic so as to have a low aspect ratio;

said pallet member comprising a top deck formed from said upper sheet of thermoplastic and having a generally upwardly facing load supporting exterior surface;

said pallet member further comprising a bottom deck formed from said lower sheet of thermoplastic and having a generally downwardly facing pallet supporting surface;

a plurality of top deck and bottom deck bosses extending between said top and bottom deck surfaces respectively formed from said upper and lower sheets of thermoplastic and being fused together, said top deck bosses being distributed in a predetermined pattern to define at least one cargo load receiving and nesting compartment means recessed into said top deck adapted for drop-on placement into said at least one compartment means of the cargo load from above said top deck, said top deck bosses being constructed and arranged to provide an array of load bearing cargo foot seating surfaces and associated cooperative nesting surfaces in said at least one compartment means for restraining cargo load foot movement horizontally relative to said pallet member, and latch means permanently attached to said pallet member and having cargo load hold down means operably movable relative to said at least one compartment means to an extended position spaced above said seating surfaces adapted for releasably engaging the cargo load as foot-supported on said seating surfaces with the cargo load pallet-positioned in its free-standing end-use orientation and with said hold down means disposed above the elevation of said seating surfaces and operable in said extended position for preventing vertical movement of the cargo load relative to said at least one compartment means with the cargo load so oriented, and being operably movable to a retracted cargo-load-disengaged position relative to said at least one compartment means clearing said seating surfaces to enable lift-off cargo load removal upwardly out of said at least one compartment means and drop-on loading of the cargo load on said seating surfaces with the cargo load pallet-positioned in its free-standing end-use orientation.

2. The pallet as set forth in claim 1 wherein said bosses are distributed in said predetermined pattern to define a plurality of said compartment means arranged in a side-by-side row array lengthwise of said pallet and each adapted for individually receiving the aforesaid cargo load to thereby support a plurality of such cargo loads in a corresponding side-by-side free-standing array.

3. The pallet as set forth in claim 2 wherein said latch hold down means is operably adapted to simultaneously engage in the extended position thereof the plurality of the cargo loads when so received on the pallet for holding all of the cargo loads against vertical movement relative to said pallet member, and being movable to said retracted position clearing all of said seating surfaces and adapted to simultaneously disengage the plurality of cargo loads.

4. The pallet as set forth in claim 1 wherein said latch hold-down means is operable to move horizontally of said pallet between said extended and retracted positions thereof.

5. The pallet as set forth in claim 4 wherein said pallet includes static cargo load engaging fixture means permanently affixed to said pallet in said at least one compartment means in non-movable relation to said pallet, said fixture means being adapted to releasably engage the cargo load during drop-on loading movement of the cargo load onto said pallet and adapted to thereupon restrain horizontal movement of the cargo load relative to said pallet.

6. The pallet as set forth in claim 5 wherein said top and bottom deck surfaces are generally flat in areas around the periphery thereto and disposed parallel with one another to thereby define flat stacking surfaces for stacking of more than one said pallet one upon the other with said bottom deck surface of one pallet juxtaposed flat against said top deck surface of a subjacent another said pallet, said latch means and said static fixture means being constructed and arranged between said flat stacking surfaces of said top and bottom deck surfaces in the retracted position of said latch means.

7. The pallet as set forth in claim 6 wherein said pallet member is constructed and arranged to carry a cargo load in the form of two front row automotive vehicle passenger seats having laterally spaced apart undercarriage side support frames providing the support for each seat, said at least one compartment means comprising a pair of generally rectangular compartments constructed and arranged to nestably individually receive therein the two front row seats oriented side-by-side for shipment on the pallet in their vehicle end-use orientation relative to one another, said hold down means being oriented with a path of travel traversing each of said compartments at an elevation above said seating surfaces therein and operably adapted for pallet hold-down retention of each of said seats when mounted in its associated top deck compartment to thereby restrain the seats against lift off movement vertically from said pallet in the extended position of said hold-down means.

8. The pallet as set forth in claim 7 wherein said pallet member is constructed and arranged to also carry second row automotive vehicle user-removable passenger seats each having front and rear feet, each second row vehicle seat having undercarriage framework adapted for removable open claw slot mounting of its front feet with floor nested mounting rods of a van vehicle and having on its rear feet releasable floor rod engageable claw mechanisms, each of said at least one compartment means having front and rear mounting platforms formed therein, said seating surfaces comprising first and second sets of four load bearing surfaces for individually receiving thereon the feet of a front row seat and a second row seat respectively, said second set of load bearing surfaces being arranged on said platforms laterally inwardly from and between said first set of load bearing surfaces and oriented for supporting an associated ode of said second row vehicle seats, said mounting platforms being adapted to nestably receive on said second set of load bearing surfaces thereof the feet of the associated second row seat, each of said front mounting platforms having rods mounted permanently therein and oriented so as to be engageable by the open slot front claws of said second row seat when rested on said second set of load bearing surfaces and moved forwardly into engagement with said rods, said second set of load bearing surfaces for said second row seats also being constructed and arranged for supporting said second row seats oriented on said pallet such that said hold down means is also engageable in the extended position thereof with a rear foot of each of said second row seats to thereby restrain the second row seats against lift off movement vertically from said pallet in the extended position of said hold down means.

9. The pallet as set forth in claim 8 wherein said pallet member is further constructed and arranged to also carry as the sole cargo load on said pallet an automotive vehicle user-removable bench seat having undercarriage framework with two front feet and two rear feet constructed in the manner of said second row seats, each of said at least one compartment means also being constructed and arranged to nestably receive the feet of the bench seat by utilizing at least some of said seating surfaces and said rods and with the bench seat oriented on said pallet such that said hold down means is also engageable in the extended position thereof with a rear foot of the bench seat thereby restrain the bench seat against lift off movement vertically from said pallet in the extended position of said hold down means.

10. The pallet as set forth in claim 4 wherein said latch means comprises an operating shaft mounted on said pallet top deck adjacent said at least one compartment means and being movable axially of the shaft and rotatable about the shaft axis between extended and retracted positions corresponding to such positions of said hold-down means, spring means yieldably biasing said shaft axially to said retracted position, latch pin means for releasably engaging the support structure of the cargo load, and arm means rotatably carried on said shaft and extending radially therefrom for carrying said pin means for movement with said shaft between the extended and retracted positions thereof, said pin means being carried on said arm means spaced radially outwardly from said shaft and oriented facing in the direction of shaft movement from retracted to extended positions, said pin means in the retracted position thereof being disposed clear of said seating surfaces and in the extended position thereof disposed above said seating surfaces, said pin means being constructed, arranged and oriented for restraining vertical motion of the support structure of the cargo load when seated on said seating surfaces on said pallet.

11. The pallet as set forth in claim 10 wherein said pallet member is constructed and arranged to carry a cargo load in the form of front row automotive vehicle passenger seats having laterally spaced apart undercarriage side support frames providing the support for each such seat, said at least one nesting compartment means comprising a pair of generally rectangular major seat nesting recess compartments constructed and arranged to each nestably individually receive therein a companion pair of the front row vehicle passenger seats oriented for shipment on the pallet in their vehicle end-use orientation relative to one another, said pin means being oriented with a path of travel intersecting each of said compartments at an elevation above said seating surfaces therein and operably adapted for pallet hold-down retention of each of said seats when mounted in its associated compartment to thereby restrain the seats against lift off movement vertically from said pallet in the extended position of said pin means.

12. The pallet as set forth in claim 11 wherein said top and bottom deck surfaces are generally flat in areas around the periphery thereof and disposed parallel with one another to thereby define flat stacking surfaces for stacking more than one of said pallet one upon the other with said bottom deck surface of one pallet juxtaposed flat against said top deck surface of a subjacent another said pallet, said latch means and said static fixture means being constructed and arranged between said flat stacking surfaces of said top and bottom deck surfaces in the retracted position of said latch means.

13. The pallet as set forth in claim 12 wherein said pallet member is constructed and arranged to also carry second row automotive vehicle user-removable passenger seats each having front and rear feet, each of the second row vehicle seats having undercarriage framework adapted for removable open claw slot mounting of its front feet with floor nested mounting rods of a van vehicle and having on its rear feet releasable floor rod engageable claw mechanisms, each of said at least one compartment means having front and rear mounting platforms formed therein, said seating surfaces comprising first and second sets of four load bearing surfaces for individually receiving thereon the feet of a front row seat and a second row seat respectively, said second set of load bearing surfaces being arranged on said platforms laterally inwardly from and between said first set of load bearing surfaces and oriented for supporting an associated one of said second row vehicle seats, said mounting platforms each being adapted to nestably receive on said second set of load bearing surfaces thereof the feet of the associated second row seat, each of said front mounting platforms having rods mounted permanently therein and oriented so as to be engageable by the open slot front claws of said second row seat when rested on said second set of load bearing surfaces and moved forwardly into engagement with said rods, said pin means being engageable with the closed slots of the releasable claw mechanism of one of the rear feet of each of said second seats for restraining vertical movement thereof upwardly off of said pallet.

14. The pallet as set forth in claim 13 wherein said pallet member is further constructed and arranged to also carry as the sole cargo load on said pallet a third row automotive vehicle user-removable bench seat having undercarriage framework with two front feet and two rear feet constructed in the manner of said second row seats, each of said at least one compartment means also being constructed and arranged to nestably receive said feet of said bench seat by utilizing at least some of said seating surfaces and said rods and with said bench seat oriented on said pallet such that said latch pin means is engageable with the closed slot of the releasable claw mechanism of one of the rear feet of said bench seat for restraining vertical movement thereof upwardly off of said pallet.

15. The pallet as set forth in claim 12 wherein said pallet member has a generally rectangular configuration in the plane of said flat stacking surfaces, said top and bottom decks each having a peripheral side wall, said side walls integrally joining said top and bottom decks and being fused together between said top and bottom decks around the periphery of said pallet, said top deck having a pair of nesting risers protruding above the major plane of said top deck stacking surface and located one at each of the opposite longitudinal ends of said pallet, said bottom deck of said pallet having a pair of nesting recesses formed upwardly into said bottom deck stacking surface and located one at each of the longitudinally opposite ends of said bottom deck in vertical alignment with the associated one of said top deck risers and shaped to nestably receive the registered top deck riser of such subjacent pallet in stacked nested relation therewith.

16. The pallet as set forth in claim 15 wherein said top deck risers have pallet identifier indicia means removably carried thereon for identifying the associated pallet and the type of cargo load carried on the pallet.

17. The pallet as set forth in claim 16 wherein said pallet member is constructed and arranged to also carry second row automotive vehicle user-removable passenger seats each having front and rear feet, each second row vehicle seats having undercarriage framework adapted for removable open claw slot mounting of its front feet with floor nested mounting rods of a van vehicle and having on its rear feet releasable floor rod engageable claw mechanisms, each of said at least one compartment means having front and rear mounting platforms formed therein, said seating surfaces comprising first and second sets of four load bearing surfaces for individually receiving thereon the feet of a front row seat and a second row seat respectively, said second set of load bearing surfaces being arranged on said platforms laterally inwardly from and between said first set of load bearing surfaces and oriented for supporting an associated one of said second row vehicle seats, said mounting platforms being adapted to nestably receive on said second set of load bearing surfaces thereof the four feet of the associated second row vehicle seat, each of said front mounting platforms having rods mounted permanently therein and oriented so as to be engageable by the open slot front claws of said second row vehicle seat when rested on said second set of load bearing surfaces and moved forwardly into engagement with said rods, said pin means being engageable with the closed slots of the releasable claw mechanism of one of the rear feet of each of the second row vehicle seats for restraining vertical movement thereof upwardly off of said pallet.

18. A shipment package comprising in combination:

a free-standing cargo load comprising a manufactured product having a high aspect ratio and support feet constructed to support the product upright in end-use orientation;

and a planar load bearing twin sheet plastic hollow pallet member normally oriented with its major plane generally horizontal in use and being formed from upper and lower sheets of thermoplastic so as to have a low aspect ratio;

said pallet member comprising a top deck formed from said upper sheet of thermoplastic and having a generally upwardly facing product supporting exterior surface;

said pallet member further comprising a bottom deck formed from said lower sheet of thermoplastic and having a generally downwardly facing pallet supporting exterior surface;

a plurality of top deck bosses and bottom deck bosses extending between said top and bottom exterior deck surfaces respectively formed from said upper and lower sheets of thermoplastic and being fused together, said top deck bosses being distributed in a predetermined pattern to define at least one nesting compartment means recessed into said top deck adapted for drop-on placement into said at least one compartment means of the product from above said top deck, said top deck bosses being constructed and arranged to provide an array of load bearing product foot compartment seating surfaces and associated cooperative compartment nesting surfaces in said at least one compartment means for restraining product foot movement horizontally relative to said pallet member, said product being partially received and nested in said at least one compartment means with said support feet individually resting on said compartment seating surfaces with said product oriented upright on said pallet top deck and projecting upwardly therefrom in end-use orientation with said pallet oriented horizontally, and latch means permanently attached to said pallet member and having product hold down means operably movable relative to said at least one compartment means to an extended position spaced above said compartment seating surfaces for releasably engaging said product as supported on its feet on said compartment seating surfaces with said product positioned in its free-standing end-use orientation and with said hold down means disposed above the elevation of said compartment seating surfaces and operable in said extended position for preventing vertical removal of said product relative to said at least one compartment means to a retracted product disengaged position clearing said compartment seating surfaces and enabling lift-off product removal upwardly out of said at least one compartment means and drop-on loading of said product on said compartment seating surfaces with said product positioned in its free-standing end-use orientation.

19. The shipment package as set forth in claim 18 comprising more than one said manufactured product each of similar size and shape and wherein said top deck bosses are distributed in said predetermined pattern to define more than one of said compartment means arranged in a side-by-side row array in said pallet, said products being individually partially received and nested in said compartment means, said product hold down means being operable to simultaneously vertically restrain said products in the extended position thereof for holding all of products against vertical lift off movement relative to said pallet member, said hold down means being operably movable to said retracted position and thereby clearing all of said compartment means seating surfaces and simultaneously freeing said products from such vertical restraint.

20. The shipping package as set forth in claim 19 wherein said hold-down means is operable to move horizontally of said pallet between said extended and retracted positions thereof.

21. The shipping package as set forth in claim 18 wherein said pallet includes static product engaging fixture means permanently affixed to said pallet in said compartment means in non-movable relation to said pallet, said fixture means being releasably engaged by said product during drop-on loading movement of said product onto said compartment means and thereupon restrain horizontal movement of said product relative to said pallet.

* * * * *